(12) United States Patent
Lustiger et al.

(10) Patent No.: US 8,119,725 B2
(45) Date of Patent: *Feb. 21, 2012

(54) FIBER REINFORCED POLYPROPYLENE COMPOSITE INTERIOR TRIM COVER PANELS

(75) Inventors: Arnold Lustiger, Edison, NJ (US); Jeffrey Valentage, Royal Oak, MI (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 927 days.

This patent is subject to a terminal disclaimer.

(21) Appl. No.: 11/387,496

(22) Filed: Mar. 23, 2006

(65) Prior Publication Data

US 2006/0264555 A1 Nov. 23, 2006

Related U.S. Application Data

(63) Continuation-in-part of application No. 11/318,363, filed on Dec. 23, 2005, which is a continuation-in-part of application No. 11/301,533, filed on Dec. 13, 2005, now Pat. No. 7,482,402.

(60) Provisional application No. 60/681,609, filed on May 17, 2005.

(51) Int. Cl.
*C08L 23/12* (2006.01)
*C08L 23/14* (2006.01)
*C08K 3/34* (2006.01)
*B29C 47/00* (2006.01)

(52) U.S. Cl. ........ 524/513; 524/451; 524/502; 524/582; 524/583; 524/445; 264/176.1; 264/164

(58) Field of Classification Search .................. 524/582, 524/451, 584, 513; 264/1.08
See application file for complete search history.

(56) References Cited

U.S. PATENT DOCUMENTS 3,304,282 A 2/1967 Cadus et al.
(Continued)

FOREIGN PATENT DOCUMENTS

DE 196 16 672 10/1997
(Continued)

OTHER PUBLICATIONS

JP 2002-240742 (Aug. 2002) Kanashiki et al.; abstract and translation in English.*

(Continued)

*Primary Examiner* — Rip A. Lee
(74) *Attorney, Agent, or Firm* — Catherine L. Bell; Darryl M. Tyus; Kristina M. Leavitt

(57) ABSTRACT

A fiber reinforced polypropylene composite interior trim cover panel. The interior trim cover panel is molded from a composition comprising at least 30 wt % polypropylene based resin, from 10 to 60 wt % organic fiber, from 0 to 40 wt % inorganic filler, and optionally from 0 to 0.1 wt % lubricant, based on the total weight of the composition, the interior trim cover panel having an outer surface and an underside surface. A process for producing an interior trim cover panel for a vehicle is also provided. The process includes the step of injection molding a composition to form the interior trim cover panel for a vehicle, the interior trim cover panel having at least an outer surface and an underside surface, wherein the composition comprises at least 30 wt % polypropylene, from 10 to 60 wt % organic fiber, from 0 to 40 wt % inorganic filler, and optionally from 0 to 0.1 wt % lubricant, based on the total weight of the composition.

28 Claims, 9 Drawing Sheets

U.S. PATENT DOCUMENTS

| | | | |
|---|---|---|---|
| 3,639,424 A | 2/1972 | Gray et al. | |
| 4,549,920 A | 10/1985 | Cogswell et al. | |
| 4,559,262 A | 12/1985 | Cogswell et al. | |
| 4,708,623 A | 11/1987 | Aoki et al. | |
| 4,737,096 A | 4/1988 | Poorten | |
| 4,752,526 A | 6/1988 | Daimon et al. | |
| 4,824,256 A | 4/1989 | Häring et al. | |
| 4,987,172 A | 1/1991 | Higashitsuji et al. | |
| 5,019,450 A | 5/1991 | Cogswell et al. | |
| 5,106,665 A | 4/1992 | Akao et al. | |
| 5,130,193 A | 7/1992 | Ikeda | |
| 5,145,891 A | 9/1992 | Yasukawa et al. | |
| 5,145,892 A * | 9/1992 | Yasukawa et al. | 524/34 |
| 5,213,889 A | 5/1993 | Cogswell et al. | |
| 5,316,834 A | 5/1994 | Matsuda et al. | |
| 5,321,071 A | 6/1994 | Fujisawa et al. | |
| 5,401,154 A | 3/1995 | Sargent | |
| 5,447,793 A | 9/1995 | Montsinger | |
| 5,520,867 A | 5/1996 | Shirai et al. | |
| 5,541,238 A | 7/1996 | Yamada et al. | |
| 5,595,696 A | 1/1997 | Schlarb et al. | |
| 5,627,226 A | 5/1997 | Lustiger et al. | |
| 5,679,456 A | 10/1997 | Sakai et al. | |
| 5,709,925 A * | 1/1998 | Spengler et al. | 428/198 |
| 5,750,616 A | 5/1998 | Shimpuku et al. | |
| 5,824,410 A | 10/1998 | Sakai et al. | |
| 5,837,172 A | 11/1998 | Pritchard et al. | |
| 6,036,501 A * | 3/2000 | Wojewnik et al. | 439/34 |
| 6,037,056 A | 3/2000 | Macdonald et al. | |
| 6,041,689 A * | 3/2000 | Lair et al. | 89/36.08 |
| 6,060,010 A | 5/2000 | Sakai et al. | |
| 6,210,613 B1 | 4/2001 | Stein et al. | |
| 6,227,840 B1 | 5/2001 | Keller et al. | |
| 6,245,415 B1 * | 6/2001 | Keller et al. | 428/188 |
| 6,284,831 B1 | 9/2001 | Shimpuku et al. | |
| 6,358,626 B1 | 3/2002 | Persson et al. | |
| 6,395,342 B1 | 5/2002 | Kadowaki et al. | |
| 6,419,864 B1 | 7/2002 | Scheuring et al. | |
| 6,422,640 B2 | 7/2002 | Whitehead et al. | |
| 6,428,728 B1 | 8/2002 | Sakai et al. | |
| 6,508,967 B2 | 1/2003 | Visconti et al. | |
| 6,627,701 B2 | 9/2003 | Adedeji et al. | |
| 6,664,470 B2 * | 12/2003 | Nagamoto | 174/652 |
| 6,683,125 B1 | 1/2004 | Augestad et al. | |
| 6,750,286 B1 | 6/2004 | Schwarte et al. | |
| 6,838,027 B2 | 1/2005 | Brodi, Jr. et al. | |
| 6,857,688 B2 | 2/2005 | Morrison et al. | |
| 6,908,573 B2 | 6/2005 | Hossan | |
| 6,986,528 B2 | 1/2006 | Inoue et al. | |
| 7,022,751 B2 | 4/2006 | Zhang et al. | |
| 7,270,863 B2 | 9/2007 | Harima et al. | |
| 7,442,435 B2 * | 10/2008 | Lee et al. | 428/297.4 |
| 2001/0028131 A1 | 10/2001 | Brodi, Jr. et al. | |
| 2001/0030444 A1 | 10/2001 | Whitehead et al. | |
| 2002/0007900 A1 | 1/2002 | Keller | |
| 2003/0114575 A1 | 6/2003 | Teutsch | |
| 2003/0164577 A1 | 9/2003 | Kieltyka et al. | |
| 2004/0028858 A1 | 2/2004 | Schnell | |
| 2004/0043206 A1 | 3/2004 | Bush et al. | |
| 2004/0209977 A1 | 10/2004 | Hossan | |
| 2004/0241332 A1 | 12/2004 | Kreis et al. | |
| 2005/0140167 A1 | 6/2005 | Jaggi | |
| 2005/0140168 A1 | 6/2005 | Emerling | |
| 2005/0189745 A1 | 9/2005 | Tanaka et al. | |
| 2005/0202223 A1 | 9/2005 | Harima et al. | |
| 2006/0019099 A1 | 1/2006 | Wang et al. | |
| 2006/0022381 A1 | 2/2006 | Brozenick et al. | |
| 2006/0261508 A1 | 11/2006 | Lustiger et al. | |
| 2006/0261509 A1 | 11/2006 | Lustiger et al. | |
| 2006/0263529 A1 | 11/2006 | Lustiger et al. | |
| 2006/0264544 A1 | 11/2006 | Lustiger et al. | |
| 2006/0264555 A1 | 11/2006 | Lustiger et al. | |
| 2006/0264556 A1 | 11/2006 | Lustiger et al. | |
| 2006/0264557 A1 | 11/2006 | Lustiger et al. | |

FOREIGN PATENT DOCUMENTS

| | | |
|---|---|---|
| DE | 29903146 | 5/1999 |
| DE | 198 22 051 | 9/1999 |
| DE | 198 31 124 | 1/2000 |
| DE | 199 34 377 | 1/2001 |
| DE | 20104584 | 8/2002 |
| DE | 101 43 883 A 1 | 3/2003 |
| DE | 102 29 298 | 1/2004 |
| EP | 0 232 522 | 8/1987 |
| EP | 0 397 881 | 11/1990 |
| EP | 0 397 881 A1 | 11/1990 |
| EP | 0 232 522 B1 | 8/1991 |
| EP | 0 056 703 B2 | 5/1992 |
| EP | 0 635 542 B1 | 1/1995 |
| EP | 644 085 | 3/1995 |
| EP | 0 669 372 | 8/1995 |
| EP | 0 669 372 A1 | 8/1995 |
| EP | 0 787 573 | 8/1997 |
| EP | 0 967 240 A2 | 6/1998 |
| EP | 1 075 918 | 2/2001 |
| EP | 1 075 918 A1 | 2/2001 |
| EP | 1 234 853 | 8/2002 |
| GB | 1 092 840 | 11/1967 |
| JP | 55-080448 | 6/1980 |
| JP | 57-017688 | 4/1982 |
| JP | 57180648 | 11/1982 |
| JP | 58-222132 | 12/1983 |
| JP | 60-239220 | 11/1985 |
| JP | 61-019662 | 1/1986 |
| JP | 63-027550 | 2/1988 |
| JP | 64-087220 | 3/1989 |
| JP | 01-104636 | 4/1989 |
| JP | 01-167370 | 7/1989 |
| JP | 01-218825 | 9/1989 |
| JP | 01-225647 | 9/1989 |
| JP | 02-003337 | 1/1990 |
| JP | 03-047711 | 2/1991 |
| JP | 03-290453 | 12/1991 |
| JP | 6-228376 * | 8/1994 |
| JP | 1995062167 A | 3/1995 |
| JP | HEI 7-21601 | 8/1995 |
| JP | 08-118389 | 5/1996 |
| JP | 1996151483 A | 6/1996 |
| JP | HEI11-80183 | 3/1999 |
| JP | 11099519 | 4/1999 |
| JP | 2935893 | 6/1999 |
| JP | 2935893 B2 | 8/1999 |
| JP | 2001-220517 | 8/2001 |
| JP | 2002-240742 * | 8/2002 |
| JP | 2002276099 A | 9/2002 |
| JP | 3454481 B2 | 10/2003 |
| JP | P3454481 B2 | 10/2003 |
| JP | 2004-123914 | 4/2004 |
| JP | 2005-144678 | 6/2005 |
| NL | 1009216 | 5/1998 |
| WO | WO 90/05164 | 5/1990 |
| WO | WO 98/30382 | 7/1998 |
| WO | WO 99/51425 | 10/1999 |
| WO | WO 01/25055 A1 | 4/2001 |
| WO | WO 02/053629 | 7/2002 |
| WO | WO 03/057453 | 7/2003 |
| WO | WO 2005/009721 | 2/2005 |

OTHER PUBLICATIONS

JP 6-228376 (08-19940 Nomura et al.; abstract and translation in English.*
U.S. Appl. No. 11/301,553, filed Dec. 13, 2005, Lustiger et al.
U.S. Appl. No. 11/318,363, filed Dec. 23, 2005, Lustiger et al.

* cited by examiner

FIBER REINFORCED POLYPROPYLENE COMPOSITE INTERIOR TRIM COVER PANELS

CROSS-REFERENCE TO RELATED APPLICATIONS

This application is a Continuation-in-Part of U.S. patent application Ser. No. 11/318,363, filed Dec. 23, 2005, which is a Continuation-in-Part of U.S. patent application Ser. No. 11/301,533, filed on Dec. 13, 2005 U.S. Pat. No. 7,482,402 and claims priority of U.S. Provisional Application Ser. No. 60/681,609 filed May 17, 2005, the contents of each are hereby incorporated by reference.

FIELD OF THE INVENTION

The present invention is directed generally to interior trim cover pieces and the like produced from fiber reinforced polypropylene compositions. The present invention is also directed to the molding of interior trim cover panels produced from fiber reinforced polypropylene compositions.

BACKGROUND OF THE INVENTION

Inflatable airbags have been well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%.

A modern airbag apparatus may include an electronic control unit (ECU) and one or more airbag modules. The ECU is usually installed in the middle of an automobile, between the passenger and engine compartments. If the vehicle has a driver airbag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag that cushions a passenger during impact to prevent injury to the passenger. In some airbag systems, the airbag may be fully inflated within 50 thousandths of a second and deflated within two tenths of a second.

Airbag systems have been primarily designed for deployment in front of an occupant, between the upper torso and head of an occupant and the windshield or instrument panel. Conventional airbags, such as driver or passenger airbags, protect the occupant's upper torso and head from colliding with a windshield or instrument panel.

Airbag technology has advanced to include airbag systems that protect occupants during a side impact or roll-over accident. In these accidents, the occupant may be thrown against the windows, doors and side-walls of the vehicle. These airbag systems are known as curtain airbags. Generally, the curtain airbag is attached to a thin long frame member that runs along a side of the roof of the vehicle.

Typically, the airbag of a curtain airbag system inflates and descends from the frame member to cover a majority of the area between the occupant and the side of the vehicle interior. The inflated airbag appears much like a curtain covering the vehicle window. The curtain airbag may protect the occupant from impact with a side window, flying shards of glass, and other projectiles. The curtain airbag may also serve to keep the occupant inside the vehicle during a roll-over accident.

Generally, the curtain airbag is installed in a very limited thin space, defined by the roof frame member. The inflator may be a thin, cylindrical member that extends a portion of the length of the curtain airbag. In this manner, the curtain airbag inflator is capable of providing sufficient inflation gas to properly inflate the curtain airbag. The gas is created from the rapid burning of pyrotechnic materials. The gas escapes exit ports in the inflator at a high velocity and temperature. Due to the limited space, the textile bag is generally stored by folding against the inflator.

An airbag cover, also called a trim cover panel, covers a compartment containing the airbag module and may reside on a steering wheel, dashboard, door, along a vehicle roof rail, vehicle wall, vehicle pillar or beneath the dash board. The airbag cover is typically made of a rigid plastic and may be forced open by the pressure from the deploying airbag. In deploying the airbag, it is preferable to retain the airbag cover to prevent the airbag cover from flying loose in the passenger compartment. If the airbag cover freely moves into the passenger compartment, it may injure a passenger. Also, to insure there will be no flying fragments ejected into the passenger compartment a cloth "scrim" is required on the back of the part to keep in fragments in place.

Interior trim cover panels currently used in connection with airbag systems are generally made of very soft and flexible rubber modified materials, in order to withstand the impact and bending of such parts during airbag deployment. As discussed above, when the airbag deploys, the interior trim cover panels must be able to withstand the impact and flex out of the way for proper bag deployment. Currently, rubber modified polypropylenes having a flexural modulus of 1000 MPA or less are the only polypropylene-based materials that are utilized. However, these products create other issues. The low flexural modulus of the material has to be countered by reinforcing the part with ribs or other types of reinforcements. With lower modulus materials the heat distortion temperature is also compromised, which causes fit and finish issues when parts are tested at or exposed to elevated temperatures.

Polyolefins have seen limited use in engineering applications due to the tradeoff between toughness and stiffness. For example, polyethylene is widely regarded as being relatively tough, but low in stiffness. Polypropylene generally displays the opposite trend, i.e., is relatively stiff, but low in toughness.

Several well known polypropylene compositions have been introduced which address the toughness issue. For example, it is known to increase the toughness of polypropylene by adding rubber particles, either in-reactor resulting in impact copolymers, or through post-reactor blending. However, while toughness is improved, stiffness is considerably reduced using this approach.

In the molding of automobile parts, such as interior trim cover panels, injection molding and compression molding processes have been employed. Injection molding of thermoplastic resin has been used for many small articles. Thermosetting polyester filled with chopped fibers has been compression molded into relatively large sheets or panels. Despite many attempts to produce interior trim cover panels having a high quality surface finish, the surface finish obtained is not particularly good.

Glass reinforced polypropylene compositions have been introduced to improve stiffness. However, the glass fibers have a tendency to break in typical injection molding equipment, resulting in reduced toughness and stiffness. In addition, glass reinforced products have a tendency to warp after injection molding.

Thermoplastic resins employing glass fibers have been extruded in sheet form. Glass fibers have also been used as a laminate in thermoplastic resin sheet form. The sheets can then be compression molded to a particular shape. As may be appreciated by those skilled in the art, compression molding has certain limitations since compression molded parts cannot be deeply drawn and thus must possess a relatively shallow configuration. Additionally, such parts are not particularly strong and require structural reinforcements when used in the production of vehicle body panels. Moreover, the surface finish of glass-filled resins is generally poor.

The automotive industry generally requires that all surfaces visible to the consumer have "class A" surface quality. Components made of glass-filled compositions often require extensive surface preparation and the application of a curable coating to provide a surface of acceptable quality and appearance. The steps required to prepare such a surface may be expensive and time consuming and may affect mechanical properties.

Although the as-molded surface quality of glass-filled components continues to improve, imperfections in their surfaces due to exposed glass fibers, glass fiber read-through, and the like often occur. These surface imperfections may further result in imperfections in coatings applied to such surfaces. Defects in the surface of glass-filled compositions and in-cured coatings applied to the surfaces of glass-filled compositions may manifest as paint popping, high long- and short-term wave scan values, orange peel, variations in gloss or the like.

Several techniques have been proposed to provide surfaces of acceptable appearance and quality. For example, overmolding of thin, preformed paint films may provide a desired Class A surface. However, such overmolding is usually applicable only for those compositions capable of providing virgin molded surfaces that do not require any secondary surface preparation operations. In-mold coating can obviate these operations, but only at the cost of greatly increased cycle time and cost. Such processes use expensive paint systems that may be applied to the part surface while the mold is re-opened slightly, and then closed to distribute and cure the coating.

As an alternative to the use of glass fibers, another known method of improving the properties of polyolefins is organic fiber reinforcement. For example, EP Patent Application No. 0397881, discloses a composition produced by melt-mixing 100 parts by weight of a polypropylene resin and 10 to 100 parts by weight of polyester fibers having a fiber diameter of 1 to 10 deniers, a fiber length of 0.5 to 50 mm and a fiber strength of 5 to 13 g/d, and then molding the resulting mixture. Also, U.S. Pat. No. 3,639,424 to Gray, Jr. et al., discloses a composition including a polymer, such as polypropylene, and uniformly dispersed therein at least about 10% by weight of the composition staple length fiber, the fiber being of man-made polymers, such as poly(ethylene terephthalate) (PET) Pr poly(1,4-cyclohexylenedimethylene terephthalate).

Fiber reinforced polypropylene compositions are also disclosed in PCT Publication WO 02/053629. More specifically, WO 02/053629 discloses a polymeric compound, comprising a thermoplastic matrix having a high flow during melt processing and polymeric fibers having lengths of from 0.1 mm to 50 mm. The polymeric compound comprises between 0.5 wt % and 10 wt % of a lubricant.

Various modifications to organic fiber reinforced polypropylene compositions are also known. For example, polyolefins modified with maleic anhydride or acrylic acid have been used as the matrix component to improve the interface strength between the synthetic organic fiber and the polyolefin, which was thought to enhance the mechanical properties of the molded product made therefrom.

Other background references include PCT Publication WO 90/05164; EP Patent Application 0669372; U.S. Pat. No. 6,395,342 to Kadowaki et al.; EP Patent Application 1075918; U.S. Pat. No. 5,145,891 to Yasukawa et al., U.S. Pat. No. 5,145,892 to Yasukawa et al.; and EP Patent 0232522, the entire disclosures of which are hereby incorporated herein by reference.

U.S. Pat. No. 3,304,282 to Cadus et al. discloses a process for the production of glass fiber reinforced high molecular weight thermoplastics in which the plastic resin is supplied to an extruder or continuous kneader, endless glass fibers are introduced into the melt and broken up therein, and the mixture is homogenized and discharged through a die. The glass fibers are supplied in the form of endless rovings to an injection or degassing port downstream of the feed hopper of the extruder.

U.S. Pat. No. 5,401,154 to Sargent discloses an apparatus for making a fiber reinforced thermoplastic material and forming parts therefrom. The apparatus includes an extruder having a first material inlet, a second material inlet positioned downstream of the first material inlet, and an outlet. A thermoplastic resin material is supplied at the first material inlet and a first fiber reinforcing material is supplied at the second material inlet of the compounding extruder, which discharges a molten random fiber reinforced thermoplastic material at the extruder outlet. The fiber reinforcing material may include a bundle of continuous fibers formed from a plurality of monofilament fibers. Fiber types disclosed include glass, carbon, graphite and Kevlar.

U.S. Pat. No. 5,595,696 to Schlarb et al. discloses a fiber composite plastic and a process for the preparation thereof and more particularly to a composite material comprising continuous fibers and a plastic matrix. The fiber types include glass, carbon and natural fibers, and can be fed to the extruder in the form of chopped or continuous fibers. The continuous fiber is fed to the extruder downstream of the resin feed hopper.

U.S. Pat. No. 6,395,342 to Kadowaki et al. discloses an impregnation process for preparing pellets of a synthetic organic fiber reinforced polyolefin. The process comprises the steps of heating a polyolefin at the temperature which is higher than the melting point thereof by 40 degree C. or more to lower than the melting point of a synthetic organic fiber to form a molten polyolefin; passing a reinforcing fiber comprising the synthetic organic fiber continuously through the molten polyolefin within six seconds to form a polyolefin impregnated fiber; and cutting the polyolefin impregnated fiber into the pellets. Organic fiber types include polyethylene terephthalate, polybutylene terephthalate, polyamide 6, and polyamide 66.

U.S. Pat. No. 6,419,864 to Scheuring et al. discloses a method of preparing filled, modified and fiber reinforced thermoplastics by mixing polymers, additives, fillers and fibers in a twin screw extruder. Continuous fiber rovings are fed to the twin screw extruder at a fiber feed zone located downstream of the feed hopper for the polymer resin. Fiber types disclosed include glass and carbon.

Application Ser. No. 11/318,363, filed Dec. 23, 2005, notes that consistently feeding PET fibers into a compounding extruder is a problem encountered during the production of polypropylene (PP)-PET fiber composites. Conventional gravimetric or vibrational feeders used in the metering and conveying of polymers, fillers and additives into the extrusion compounding process, while effective in conveying pellets or powder, are not effective in conveying cut fiber. Another issue encountered during the production of PP-PET fiber composites is adequately dispersing the PET fibers into the PP matrix while still maintaining the advantageous mechanical properties imparted by the incorporation of the PET fibers. More particularly, extrusion compounding screw configuration may impact the dispersion of PET fibers within the PP matrix, and extrusion compounding processing conditions may impact not only the mechanical properties of the matrix polymer, but also the mechanical properties of the PET fibers. Application Ser. No. 11/318,363, filed Dec. 23, 2005, proposes solutions to these problems.

Despite advances in the art, a need exists for a composite interior cover trim panel having improved stiffness, surface finish, impact resistance and flexural modulus characteristics and for a process for making such fiber reinforced polypropylene composite interior cover trim panels.

SUMMARY OF THE INVENTION

Provided is a fiber reinforced polypropylene composite interior trim cover panel. The interior trim cover panel is molded from a composition comprising at least 30 wt % polypropylene based resin, from 10 to 60 wt % organic fiber, and from 0 to 40 wt % inorganic filler, based on the total weight of the composition, the interior trim cover panel having an outer surface and an underside surface.

In another aspect, provided is a process for producing an interior trim cover panel for a vehicle is also provided. The process includes the step of injection molding a composition to form the interior trim cover panel for a vehicle, the interior trim cover panel having at least an outer surface and an underside surface, wherein the composition comprises at least 30 wt % polypropylene, from 10 to 60 wt % organic fiber, from 0 to 40 wt % inorganic filler, and optionally lubricant (typically present at from 0 to 0.1 wt %), based on the total weight of the composition.

In yet another aspect, provided is a process for making fiber reinforced polypropylene composite interior trim cover panels, comprising the steps of: feeding into a twin screw extruder hopper at least about 25 wt % of a polypropylene based resin with a melt flow rate of from about 20 to about 1500 g/10 minutes; continuously feeding by unwinding from one or more spools into the twin screw extruder hopper from about 5 wt % to about 40 wt % of an organic fiber; feeding into a twin screw extruder from about 10 wt % to about 60 wt % of an inorganic filler; extruding the polypropylene based resin, the organic fiber, and the inorganic filler through the twin screw extruder to form a fiber reinforced polypropylene composite melt; cooling the fiber reinforced polypropylene composite melt to form a solid fiber reinforced polypropylene composite; injection molding the fiber reinforced polypropylene composite to form the interior trim cover panel for a vehicle, the interior trim cover panel having an outer surface and an underside surface.

It has surprisingly been found that high quality composite interior trim cover panels can be produced from substantially lubricant-free fiber reinforced polypropylene compositions, the resultant interior trim cover panels possessing a flexural modulus of at least 300,000 psi and exhibiting ductility during instrumented impact testing. Particularly surprising is the ability to make such composite interior trim cover panels using a wide range of polypropylenes as the matrix material, including some polypropylenes that, without fiber, are very brittle.

It has also been surprisingly found that organic fiber may be fed into a twin screw compounding extruder by continuously unwinding from one or more spools into the feed hopper of the twin screw extruder, and then chopped into ¼ inch to 1 inch lengths by the twin screws to form a fiber reinforced polypropylene based composite for use in producing high quality composite interior trim cover panels.

Numerous advantages result from the composite interior trim cover panels and the method of making disclosed herein and the uses/applications therefore.

For example, in exemplary embodiments of the present disclosure, the disclosed polypropylene fiber composite interior trim cover panels exhibit improved instrumented impact resistance.

In a further exemplary embodiment of the present disclosure, the disclosed polypropylene fiber composite interior trim cover panels exhibit improved flexural modulus.

In a further exemplary embodiment of the present disclosure, the disclosed polypropylene fiber composite interior trim cover panels do not splinter during instrumented impact testing.

In yet a further exemplary embodiment of the present disclosure, the disclosed polypropylene fiber composite interior trim cover panels exhibit fiber pull out during instrumented impact testing without the need for lubricant additives.

In yet a further exemplary embodiment of the present disclosure, the disclosed polypropylene fiber composite interior trim cover panels exhibit a higher heat distortion temperature compared to rubber toughened polypropylene.

In yet a further exemplary embodiment of the present disclosure, the disclosed polypropylene fiber composite interior trim cover panels exhibit a lower flow and cross flow coefficient of linear thermal expansion compared to rubber toughened polypropylene.

In still yet a further exemplary embodiment of the present disclosure, the disclosed polypropylene fiber composite interior trim cover panels exhibit the ability to provide class A surface finishes.

These and other advantages, features and attributes of the disclosed polypropylene fiber composite interior trim cover panels, and method of making of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

Reference is now made to FIGS. 1-9, wherein like numerals are used to designate like parts throughout.

Figure 1:
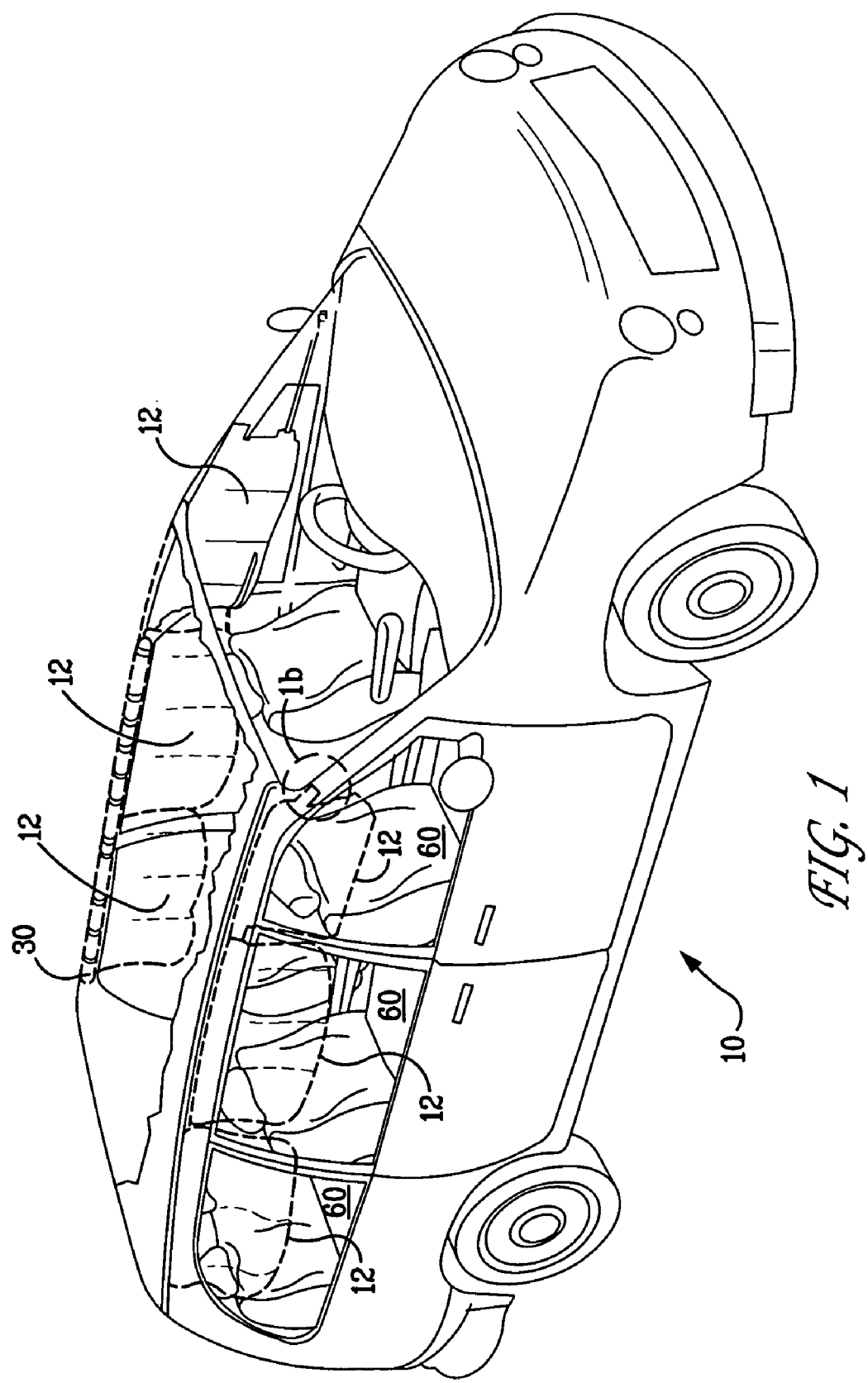
FIG. 1 is a perspective view illustrating within a vehicle a curtain airbag system, employing interior trim cover panels of the present invention, in a deployed position.
Figure 2:
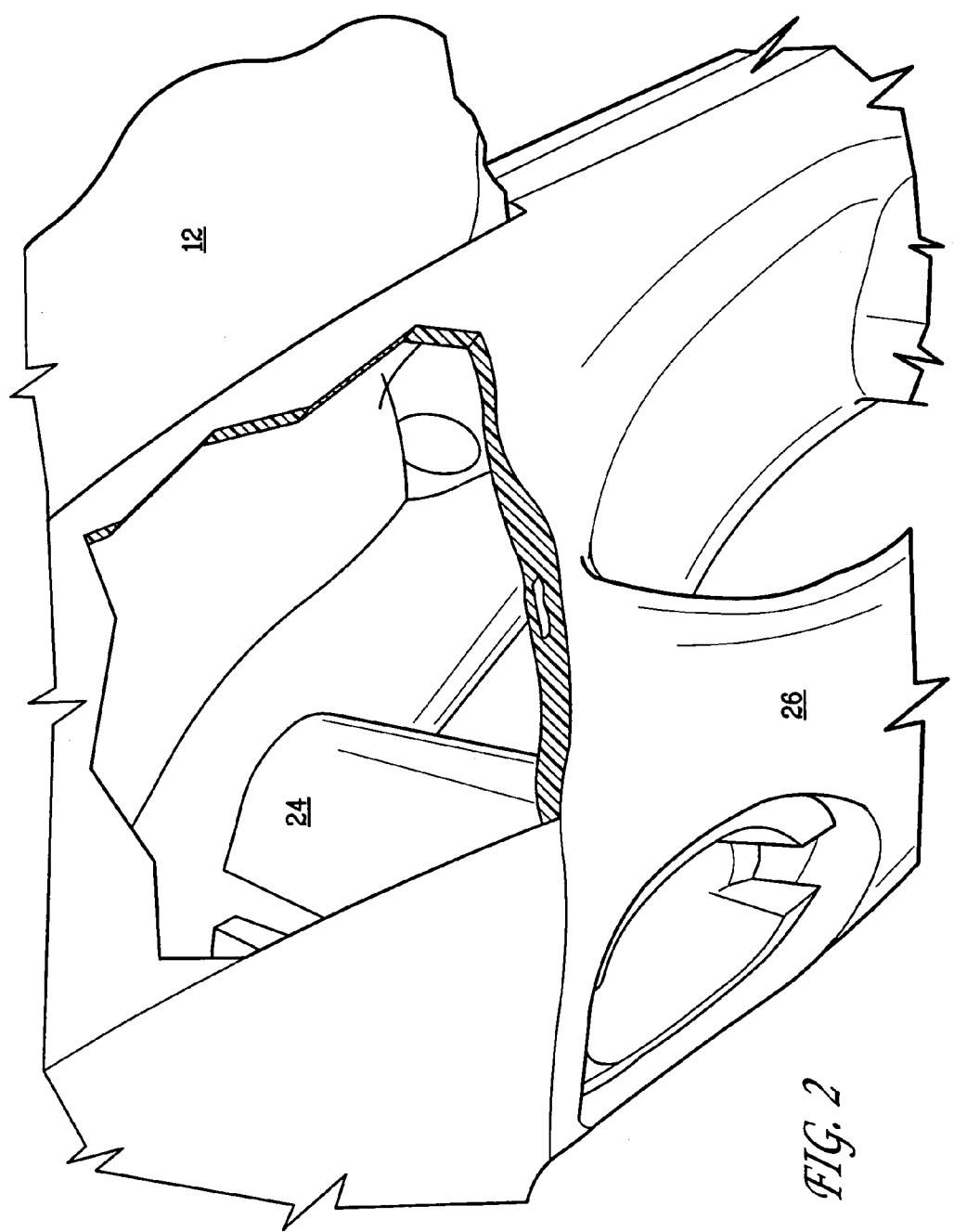
FIG. 2 is an exploded sectional view of an A-pillar interior trim cover panel of the present invention, taken from section 1b of FIG. 1.

Disclosed herein are improved fiber reinforced polypropylene composite vehicle interior trim cover panels and a process for making same. Composite vehicle interior trim cover panels of the type contemplated herein are generically depicted in FIGS. 1-6 for a vehicle 10. Referring to FIG. 1, vehicle 10 is shown with a curtain airbag system in a deployed position, showing the manner in which such a system can protect vehicle occupants in the event of a collision.

Figure 3:
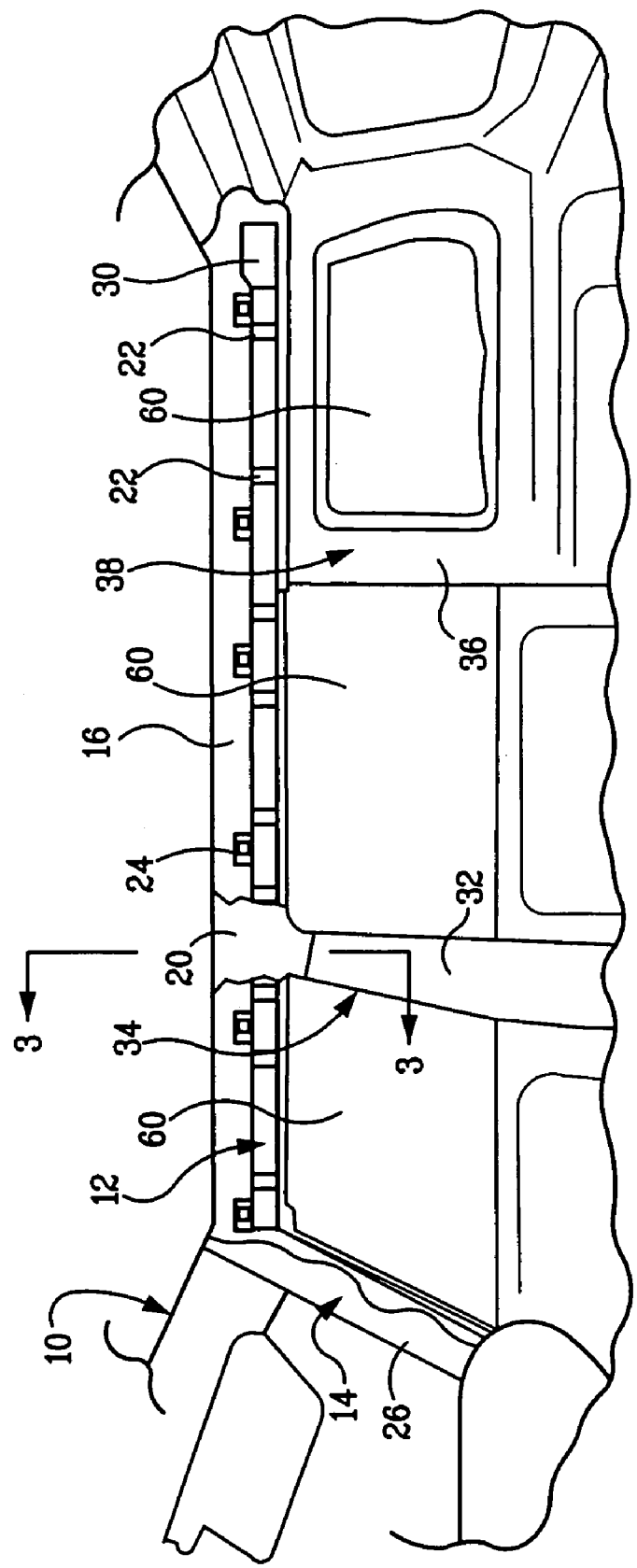
FIG. 3 is a side view showing, in a housed position, a curtain airbag system housed within interior trim cover panels of the present invention.
Figure 4:
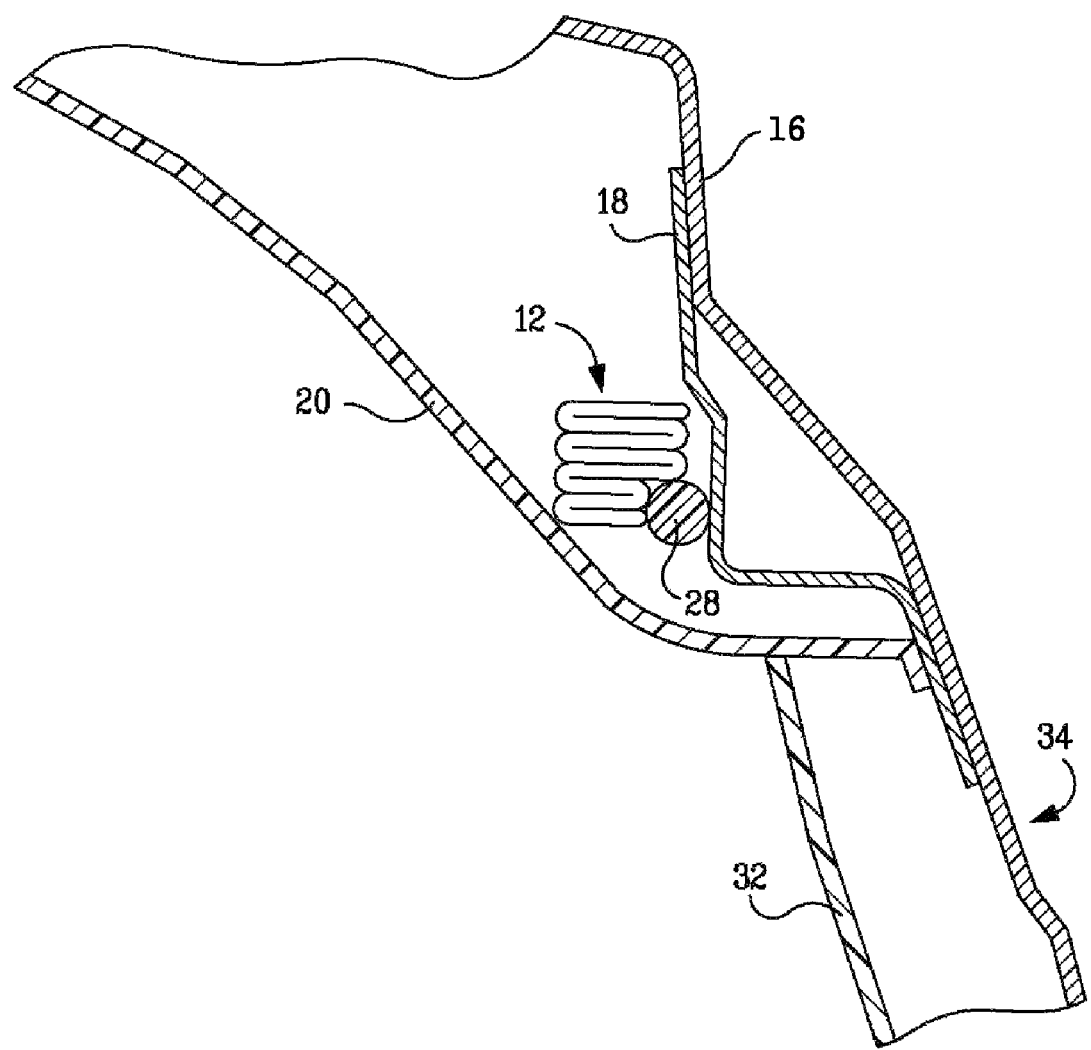
FIG. 4 is a cross-sectional view taken along line 3-3 of FIG. 3.

FIG. 3 presents a side view taken from the interior of vehicle 10 and shows a curtain airbag system in a housed position to better view the exemplary fiber reinforced polypropylene composite vehicle interior trim cover panels contemplated herein. FIG. 4 presents a cross-sectional view taken along line 3-3 of FIG. 3. With reference to FIGS. 3-4, the airbag system, when in a housed position, and the fiber reinforced polypropylene composite vehicle interior trim cover panels, according to an exemplary form contemplated herein, shown for purposes of example and not by way of limitation, will be explained hereinbelow. As illustrated in FIG. 3, vehicle 10 is shown, for purposes of example but not by way of limitation, to be of a type having relatively-wide side windows 60 and a tall body, such as a passenger van, mini-van or sport utility vehicle. A curtain airbag 12 extends along from a front pillar portion (A pillar portion) 14 (also see FIG. 2) to a roof side rail portion 16 of the vehicle 10, and is stored in a position folded in between a roof side rail member (vehicle body component) 18 (shown in FIG. 4) and a fiber reinforced polypropylene composite roof trim cover panel 20. The roof side rail member 18 (shown in FIG. 4) is attached to the roof side rail portion 16, as shown in FIG. 4, and the fiber reinforced polypropylene composite roof trim cover panel 20 is attached so as to cover a surface of the roof side rail member 18 together with a roof panel. The airbag 12 is retained in its folded position by being wound with tape 22 at several places. The airbag 12 is secured to the roof side rail member 18 through projections 24 disposed in an upper end portion of the airbag 12 at several places. The airbag 12 is accommodated also in a fiber reinforced polypropylene composite front pillar trim cover panel 26 so as to extend from a front end portion of the roof side rail portion 16 to a lower end portion of the A pillar portion 14. For additional detail, see FIG. 2.

In a lower end portion of airbag 12, an airbag displacement member 28 (shown in FIG. 4) is disposed in the inside of airbag 12. The displacement member 28 (shown in FIG. 4) is retained in a position on the side of the roof side rail member 18 under the airbag 12. Disposed in a rear end portion of the roof side rail portion 16 is an inflator 30 connected to a rear end portion of the airbag 12.

The fiber reinforced polypropylene composite roof trim cover panel 20 may be configured so as to provide a tip end that is detachably fastened to the roof side rail member 18 by using a fiber reinforced polypropylene composite center pillar cover trim 32 of a center pillar portion (B pillar portion) 34 and a fiber reinforced polypropylene composite quarter pillar cover trim 36 of a quarter pillar portion (C pillar portion) 38 as shown in FIG. 3. Tip ends of the fiber reinforced polypropylene composite front pillar trim cover panel 26 are detachably fastened by using, for example, a door opening trim, not shown.

Figure 5:
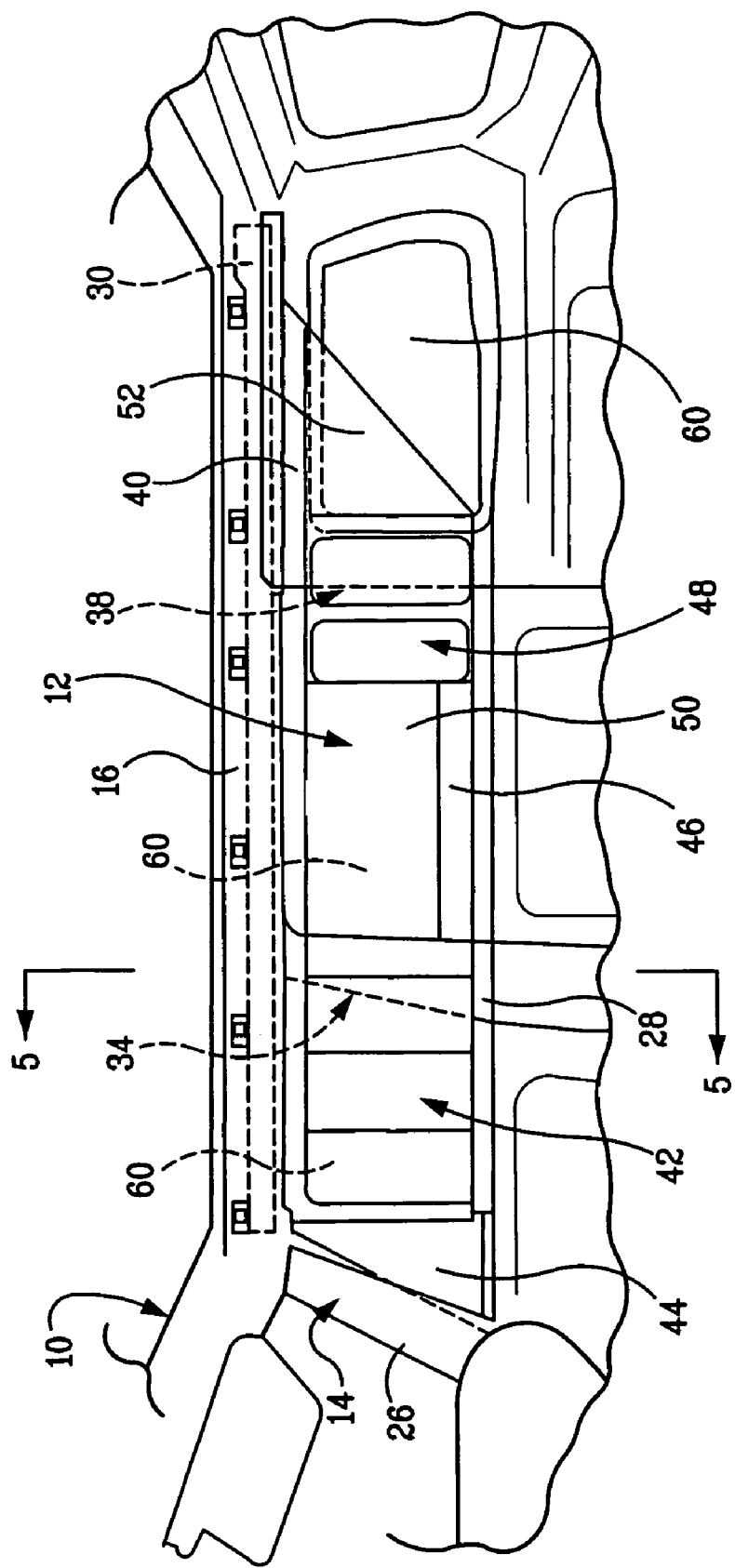
FIG. 5 is a side view showing a deployed position of the curtain airbag system.

FIG. 1 is a perspective view and FIG. 5 is a side view showing an exemplary deployed curtain airbag system of the type described above, and FIG. 6 is a cross-sectional view taken along line 5-5 of FIG. 5.

As illustrated in FIG. 1 and FIG. 5, the airbag 12 is made up of an inflatable portion 40 provided along the roof side rail portion 16 located in the upper end portion, an inflatable portion 42 and a fabric portion 44 both positioned on a front seat side, and inflatable portions 46 and 48 and fabric portions 50 and 52 all positioned on a back seat side.

The inflatable portions 40 and 46 are cylindrical inflatable bodies extending in a longitudinal direction of the vehicle, and the inflatable portions 42 and 48 are formed of a plurality of cylindrical inflatable bodies extending in a vertical direction of the vehicle, although several configurations are contemplated. The inflatable portion 40 internally communicates with each of the inflatable bodies of the inflatable portions 42 and 48, while the inflatable portion 46 internally communicates with the inflatable bodies of the inflatable portions 42 and 48 that are disposed with the inflatable portion 46 therebetween.

A front end of a lower end portion of the triangular fabric portion 44 is secured to the A pillar portion 14, while a side of a rear end thereof is joined to a side of a front end of the inflatable portion 42. Each side of the four-sided fabric portions 50 is joined to the inflatable portions 40, 42, 46 and 48 respectively. A side of an upper end of the triangular fabric portion 52 is joined to the inflatable portion 40, and a side of a front end to the inflatable portion 48.

Displacement member 28 may also be formed from a fiber reinforced polypropylene composite and is designed to have a requisite amount of weight, rigidity and elasticity. Displacement member 28 may have a circular section, as shown.

In operation, if a predetermined or greater side impact is applied to a side body of the vehicle 10 in a side collision or the like, an airbag activation sensor (not shown in FIG. 5, 1b in FIG. 1), sends a signal to a control unit, also not shown. In response to the signal, the control unit sends an activation signal to the inflator 30, and the inflator 30 then injects gas into the airbag 12. The gas from the inflator 30 flows into the inflatable portion 40 of the airbag 12, which expands the inflatable portion 40. The expansion of the inflatable portion 40 breaks the tapes 22 and the gas sequentially flows into the inflatable portions 48, 42 and 46 to expand the inflatable portions 48, 42 and 46. At the same time, the fabric portions 44, 50 and 52 are also deployed.

Figure 6:
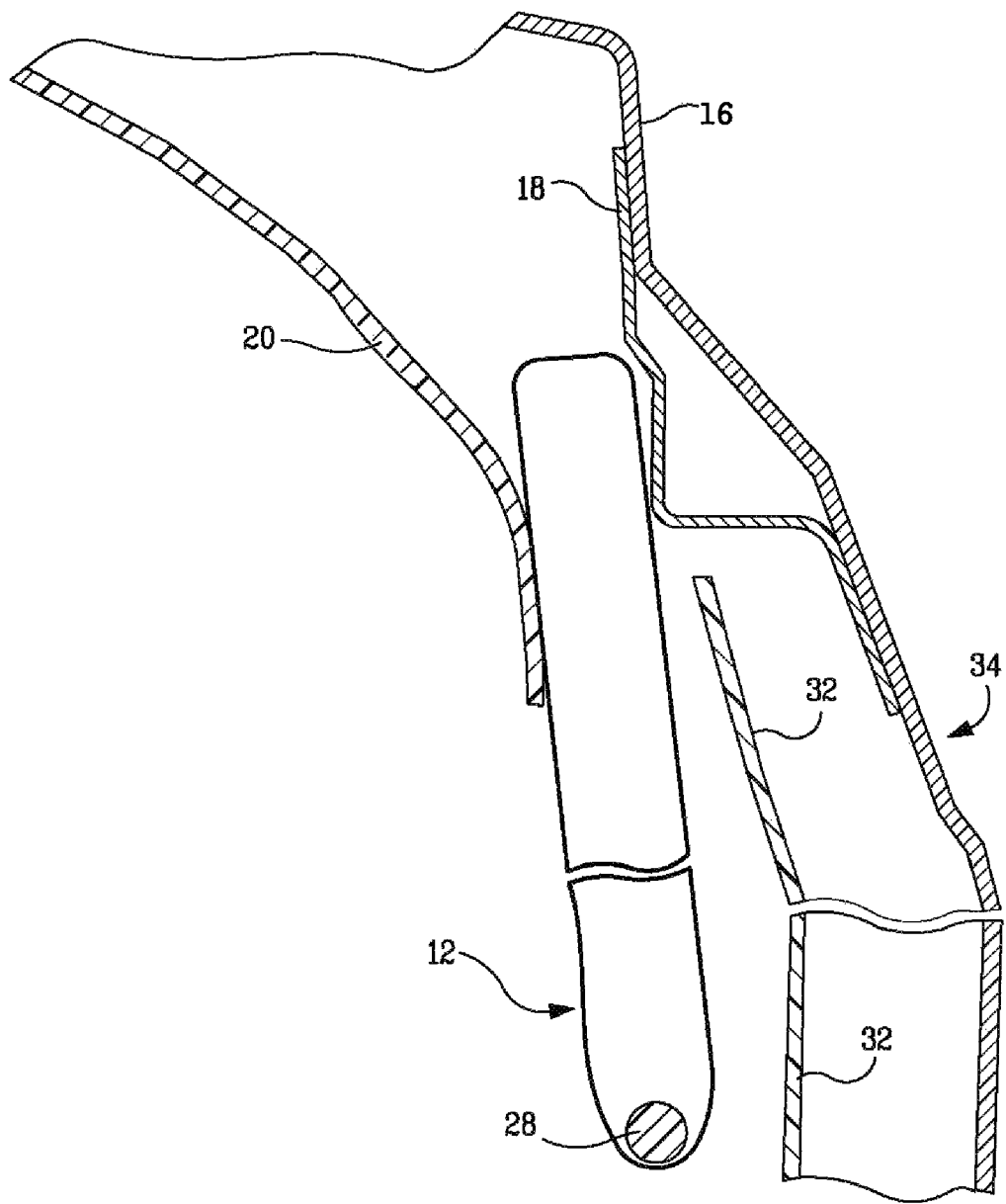
FIG. 6 is a cross-sectional view taken along line 5-5 of FIG. 5 showing interior trim cover panels of the present invention following deployment of a curtain airbag system.

In this process, the airbag 12 presses against the fiber reinforced polypropylene composite roof trim cover panel 20 by using the displacement member 28 contained in the lower end portion thereof, and releases the tip end of the fiber reinforced polypropylene composite roof trim cover panel 20 from the fiber reinforced polypropylene composite center pillar cover trim 32 (not shown) and fiber reinforced polypropylene composite quarter pillar cover trim 36 (not shown) and the door opening trim to detach the tip end of the fiber reinforced polypropylene composite roof trim cover panel 20 from the roof side rail member 18, as shown in FIG. 6. The airbag 12 is then deployed while pushing and bending the fiber reinforced polypropylene composite roof trim cover panel 20 toward the inside of the vehicle as shown in FIG. 5. As such, the tip end of the fiber reinforced polypropylene composite roof trim cover panel 20 can be easily detached from the roof side rail member 18 by means of the displacement member 28, which enables prompt and reliable deployment of the airbag 12.

Although, as shown, the tip end of the fiber reinforced polypropylene composite roof trim cover panel 20 is detached from the roof side rail member 18 by using the displacement member 28, systems may be configured in any number of alternative designs and still benefit from the fiber reinforced polypropylene composite interior trim cover panels contemplated herein.

One such alternative configuration is one in which displacement member 28 directly breaks through the fiber reinforced polypropylene composite roof trim cover panel 20. This is acceptable so long as no splintering occurs. Advantageously, the fiber reinforced polypropylene composites disclosed herein do not splinter and, as such, are vastly superior to other materials when used in such designs. Instead of shattering, under impact loading a fiber reinforced polypropylene composite interior cover panel made from the compositions disclosed herein exhibit a "hinge-effect" rather than break, minimizing injury to the occupants. By "hinge-effect" is meant that the fibers of the composition are effective to connect otherwise fractured pieces after impact. An additional benefit of the fiber reinforced polypropylene composites disclosed herein is that class A surfaces may be obtained, free of aesthetic blemishes and defects. Further, the heat distortion temperature of these materials range from 130-140° C., much higher than the 80-100° C. heat distortion temperature of rubber modified polypropylenes.

As may be appreciated, the molding of other interior trim cover panels from the fiber reinforced polypropylene composites disclosed herein is contemplated and within the scope of the present invention. Such interior trim cover panels include steering wheel covers, dashboard panels, interior door trim panels, vehicle roof rail covers, whether associated with airbags or not, other vehicle interior wall panels, or panels beneath the dashboard.

Additionally, it is contemplated that the fiber reinforced polypropylene composite interior trim cover panels contemplated herein may be employed as a substrate for further processing, such as by two-shot/2K injection molding. For example, a sealing member of thermoplastic vulcanizate (TPV) can be molded onto a composite interior trim cover panel using two-shot/2K injection molding. Also, in some luxury automobile applications, it may be desirable to cover one or more fiber reinforced polypropylene composite interior trim cover panels in cloth, for appearance or aesthetic purposes, despite the fact the part or parts can be produced with an otherwise acceptable surface finish.

The fiber reinforced polypropylene composite interior trim cover panels contemplated herein are molded from a composition comprising a combination of a polypropylene based matrix with organic fiber and inorganic filler, which in combination advantageously yield body panels with a flexural modulus of at least 300,000 psi and ductility during instrumented impact testing (15 mph, −29° C., 25 lbs). The fiber reinforced polypropylene interior trim cover panels employ a polypropylene based matrix polymer with an advantageous high melt flow rate without sacrificing impact resistance. In addition, the fiber reinforced polypropylene composite interior trim cover panels disclosed herein do not splinter during instrumented impact testing.

The fiber reinforced polypropylene composite interior trim cover panels contemplated herein simultaneously have desirable stiffness, as evidenced by possessing a flexural modulus of at least 300,000 psi, and toughness, as evidenced by possessing ductility during instrumented impact testing. The fiber reinforced polypropylene composite interior trim cover panels have a flexural modulus of at least 350,000 psi, or at least 370,000 psi, or at least 390,000 psi, or at least 400,000 psi, or at least 450,000 psi. Still more particularly, the fiber reinforced polypropylene composite interior trim cover panels have a flexural modulus of at least 600,000 psi, or at least 800,000 psi. It is also believed that having a weak interface between the polypropylene matrix and the fiber of the fiber reinforced polypropylene composite vehicle body panels contributes to fiber pullout; and, therefore, may enhance toughness. Thus, there is no need to add modified polypropylenes to enhance bonding between the fiber and the polypropylene matrix, although the use of modified polypropylene may be advantageous to enhance the bonding between a filler, such as talc or wollastonite and the matrix. In addition, in one embodiment, there is no need to add lubricant to weaken the interface between the polypropylene and the fiber to further enhance fiber pullout. Some embodiments also display no splintering during instrumented dart impact testing, which yield a further advantage of not subjecting a person in close proximity to the impact to potentially harmful splintered fragments.

The fiber reinforced polypropylene composite interior trim cover panels disclosed herein are formed from a composition that includes at least 30 wt %, based on the total weight of the composition, of polypropylene as the matrix resin. In a particular embodiment, the polypropylene is present in an amount of at least 30 wt %, or at least 35 wt %, or at least 40 wt %, or at least 45 wt %, or at least 50 wt %, or in an amount within the range having a lower limit of 30 wt %, or 35 wt %, or 40 wt %, or 45 wt %, or 50 wt %, and an upper limit of 75 wt %, or 80 wt %, based on the total weight of the composition. In another embodiment, the polypropylene is present in an amount of at least 25 wt %.

The polypropylene used as the matrix resin for use in the fiber reinforced polypropylene composite interior trim cover panels contemplated herein is not particularly restricted and is generally selected from the group consisting of propylene homopolymers, propylene-ethylene random copolymers, propylene-α-olefin random copolymers, propylene block copolymers, propylene impact copolymers, and combinations thereof. In a particular embodiment, the polypropylene is a propylene homopolymer. In another particular embodiment, the polypropylene is a propylene impact copolymer comprising from 78 to 95 wt % homopolypropylene and from 5 to 22 wt % ethylene-propylene rubber, based on the total weight of the impact copolymer. In a particular aspect of this embodiment, the propylene impact copolymer comprises from 90 to 95 wt % homopolypropylene and from 5 to 10 wt % ethylene-propylene rubber, based on the total weight of the impact copolymer.

The polypropylene of the matrix resin may have a melt flow rate of from about 20 to about 1500 g/10 min. In a particular embodiment, the melt flow rate of the polypropylene matrix resin is greater 100 g/10 min, and still more particularly greater than or equal to 400 g/10 min. In yet another embodiment, the melt flow rate of the polypropylene matrix resin is about 1500 g/10 min. The higher melt flow rate permits for improvements in processability, throughput rates, and higher loading levels of organic fiber and inorganic filler without negatively impacting flexural modulus and impact resistance.

In a particular embodiment, the matrix polypropylene contains less than 0.1 wt % of a modifier, based on the total weight of the polypropylene. Typical modifiers include, for example, unsaturated carboxylic acids, such as acrylic acid, methacrylic acid, maleic acid, itaconic acid, fumaric acid or esters thereof, maleic anhydride, itaconic anhydride, and derivates thereof. In another particular embodiment, the matrix polypropylene does not contain a modifier. In still yet another particular embodiment, the polypropylene based polymer further includes from about 0.1 wt % to less than about 10 wt % of a polypropylene based polymer modified with a grafting agent. The grafting agent includes, but is not limited to, acrylic acid, methacrylic acid, maleic acid, itaconic acid, fumaric acid or esters thereof, maleic anhydride, itaconic anhydride, and combinations thereof.

The polypropylene may further contain additives commonly known in the art, such as dispersant, lubricant, flame-retardant, antioxidant, antistatic agent, light stabilizer, ultraviolet light absorber, carbon black, nucleating agent, plasticizer, and coloring agent such as dye or pigment. The amount of additive, if present, in the polypropylene matrix is generally from 0.1 wt %, or 0.5 wt %, or 2.5 wt %, to 7.5 wt %, or 10 wt %, based on the total weight of the matrix. Diffusion of additive(s) during processing may cause a portion of the additive(s) to be present in the fiber.

The invention is not limited by any particular polymerization method for producing the matrix polypropylene, and the polymerization processes described herein are not limited by any particular type of reaction vessel. For example, the matrix polypropylene can be produced using any of the well known processes of solution polymerization, slurry polymerization, bulk polymerization, gas phase polymerization, and combinations thereof. Furthermore, the invention is not limited to any particular catalyst for making the polypropylene, and may, for example, include Ziegler-Natta or metallocene catalysts.

The fiber reinforced polypropylene composite interior trim cover panels contemplated herein are formed from compositions that also generally include at least 10 wt %, based on the total weight of the composition, of an organic fiber. In a particular embodiment, the fiber is present in an amount of at least 10 wt %, or at least 15 wt %, or at least 20 wt %, or in an amount within the range having a lower limit of 10 wt %, or 15 wt %, or 20 wt %, and an upper limit of 50 wt %, or 55 wt %, or 60 wt %, or 70 wt %, based on the total weight of the composition. In another embodiment, the organic fiber is present in an amount of at least 5 wt % and up to 40 wt %.

The polymer used as the fiber is not particularly restricted and is generally selected from the group consisting of polyalkylene terephthalates, polyalkylene naphthalates, polyamides, polyolefins, polyacrylonitrile, and combinations thereof. In a particular embodiment, the fiber comprises a polymer selected from the group consisting of polyethylene terephthalate (PET), polybutylene terephthalate, polyamide and acrylic. In another particular embodiment, the organic fiber comprises PET.

In one embodiment, the fiber is a single component fiber. In another embodiment, the fiber is a multicomponent fiber wherein the fiber is formed from a process wherein at least two polymers are extruded from separate extruders and melt-blown or spun together to form one fiber. In a particular aspect of this embodiment, the polymers used in the multicomponent fiber are substantially the same. In another particular aspect of this embodiment, the polymers used in the multi-component fiber are different from each other. The configuration of the multicomponent fiber can be, for example, a sheath/core arrangement, a side-by-side arrangement, a pie arrangement, an islands-in-the-sea arrangement, or a variation thereof. The fiber may also be drawn to enhance mechanical properties via orientation, and subsequently annealed at elevated temperatures, but below the crystalline melting point to reduce shrinkage and improve dimensional stability at elevated temperature.

The length and diameter of the fiber employed in the fiber reinforced polypropylene composite vehicle body panels contemplated herein are not particularly restricted. In a particular embodiment, the fibers have a length of ¼ inch, or a length within the range having a lower limit of ⅛ inch, or ⅙ inch, and an upper limit of ⅓ inch, or ½ inch. In another particular embodiment, the diameter of the fibers is within the range having a lower limit of 10 μm and an upper limit of 100 μm.

The fiber may further contain additives commonly known in the art, such as dispersants, lubricants, flame-retardants, antioxidants, antistatic agents, light stabilizers, ultraviolet light absorbers, carbon black, nucleating agents, plasticizers, and coloring agents, such as dyes or pigments.

The fiber used in the fiber reinforced polypropylene composite interior trim cover panels contemplated herein-is not limited by any particular fiber form. For example, the fiber can be in the form of continuous filament yarn, partially oriented yarn, or staple fiber. In another embodiment, the fiber may be a continuous multifilament fiber or a continuous monofilament fiber.

The compositions employed in the fiber reinforced polypropylene composite interior trim cover panels contemplated herein optionally include inorganic filler in an amount of at least 1 wt %, or at least 5 wt %, or at least 10 wt %, or in an amount within the range having a lower limit of 0 wt %, or 1 wt %, or 5 wt %, or 10 wt %, or 15 wt %, and an upper limit of 25 wt %, or 30 wt %, or 35 wt %, or 40 wt %, based on the total weight of the composition. In yet another embodiment, the inorganic filler may be included in the polypropylene fiber composite in the range of from 10 wt % to about 60 wt %. In a particular embodiment, the inorganic filler is selected from the group consisting of talc, calcium carbonate, calcium hydroxide, barium sulfate, mica, calcium silicate, clay, kaolin, silica, alumina, wollastonite, magnesium carbonate, magnesium hydroxide, magnesium oxysulfate, titanium oxide, zinc oxide, zinc sulfate, and combinations thereof. The talc may have a size of from about 1 to about 100 microns.

Preferred for use in the compositions employed in the fiber reinforced polypropylene composite interior trim cover panels contemplated herein is high aspect ratio talc. Although aspect ratio can be calculated by dividing the average particle diameter of the talc by the average thickness using a conventional microscopic method, this is a difficult and tedious technique. A particularly useful indication of aspect ratio is known in the art as "lamellarity index," which is a ratio of particle size measurements. Therefore, as used herein, by "high aspect ratio" talc is meant talc having an average lamellarity index greater than or equal to about 4 or greater than or equal to about 5. A talc having utility in the compositions disclosed herein preferably has a specific surface area of at least 14 square meters/gram.

In one particular embodiment, at a high talc loading of up to about 60 wt %, the polypropylene fiber composite exhibited a flexural modulus of at least about 750,000 psi and no splintering during instrumented impact testing (15 mph, −29° C. and 25 lbs). In another particular embodiment, at a low talc loading of as low as 10 wt %, the polypropylene fiber composite exhibited a flexural modulus of at least about 325,000 psi and no splintering during instrumented impact testing (15 mph, −29° C. and 25 lbs). In addition, wollastonite loadings of from 5 wt % to 60 wt % in the polypropylene fiber composite yielded an outstanding combination of impact resistance and stiffness.

In another particular embodiment, a fiber reinforced polypropylene composition including a polypropylene based resin with a melt flow rate of 80 to 1500, 10 to 15 wt % of polyester fiber, and 50 to 60 wt % of inorganic filler displayed a flexural modulus of 850,000 to 1,200,000 psi and did not shatter during instrumented impact testing at −29 degrees centigrade, tested at 25 pounds and 15 miles per hour. The inorganic filler includes, but is not limited to, talc and wollastonite. This combination of stiffness and toughness is difficult to achieve in a polymeric based material. In addition, the fiber reinforced polypropylene composition has a heat distortion temperature at 66 psi of greater than 100 degrees centigrade, and a flow and cross flow coefficient of linear thermal expansion of $2.2 \times 10^{-5}$ and $3.3 \times 10^{-5}$ per degree centigrade respectively. In comparison, rubber toughened polypropylene has a heat distortion temperature of 94.6 degrees centigrade, and a flow and cross flow thermal expansion coefficient of $10 \times 10^{-5}$ and $18.6 \times 10^{-5}$ per degree centigrade respectively Composite interior trim cover panels of the present invention are made by forming the fiber-reinforced polypropylene composition and then injection molding the composition to form the interior trim cover panel. The invention is not limited by any particular method for forming the compositions. For example, the compositions can be formed by contacting polypropylene, organic fiber, and optional inorganic filler in any of the well known processes of pultrusion or extrusion compounding. In a particular embodiment, the compositions are formed in an extrusion compounding process. In a particular aspect of this embodiment, the organic fibers are cut prior to being placed in the extruder hopper. In another particular aspect of this embodiment, the organic fibers are fed directly from one or more spools into the extruder hopper.

Figure 7:
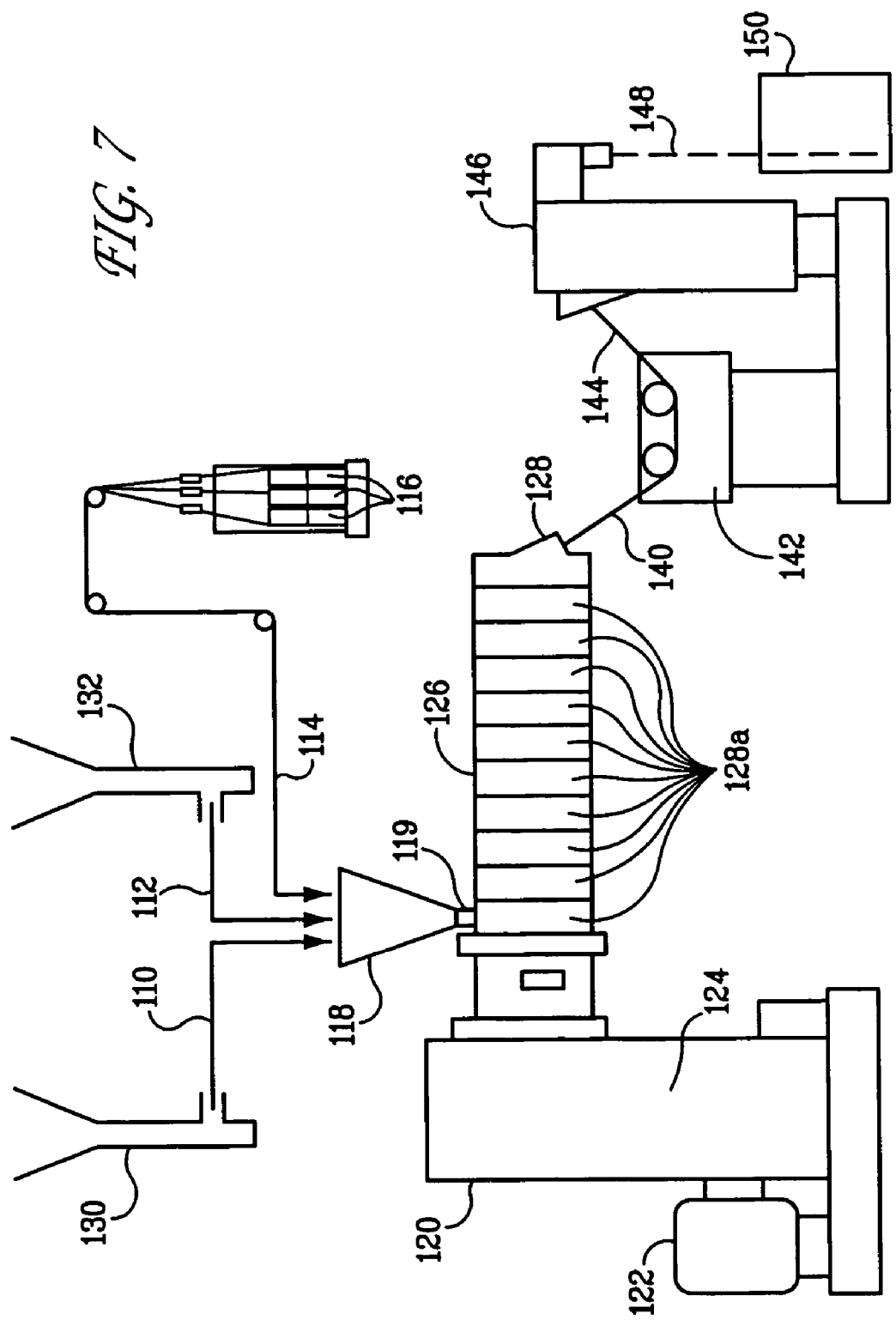
FIG. 7 depicts an exemplary schematic of the process for making fiber reinforced polypropylene composites of the instant invention.
Figure 8:
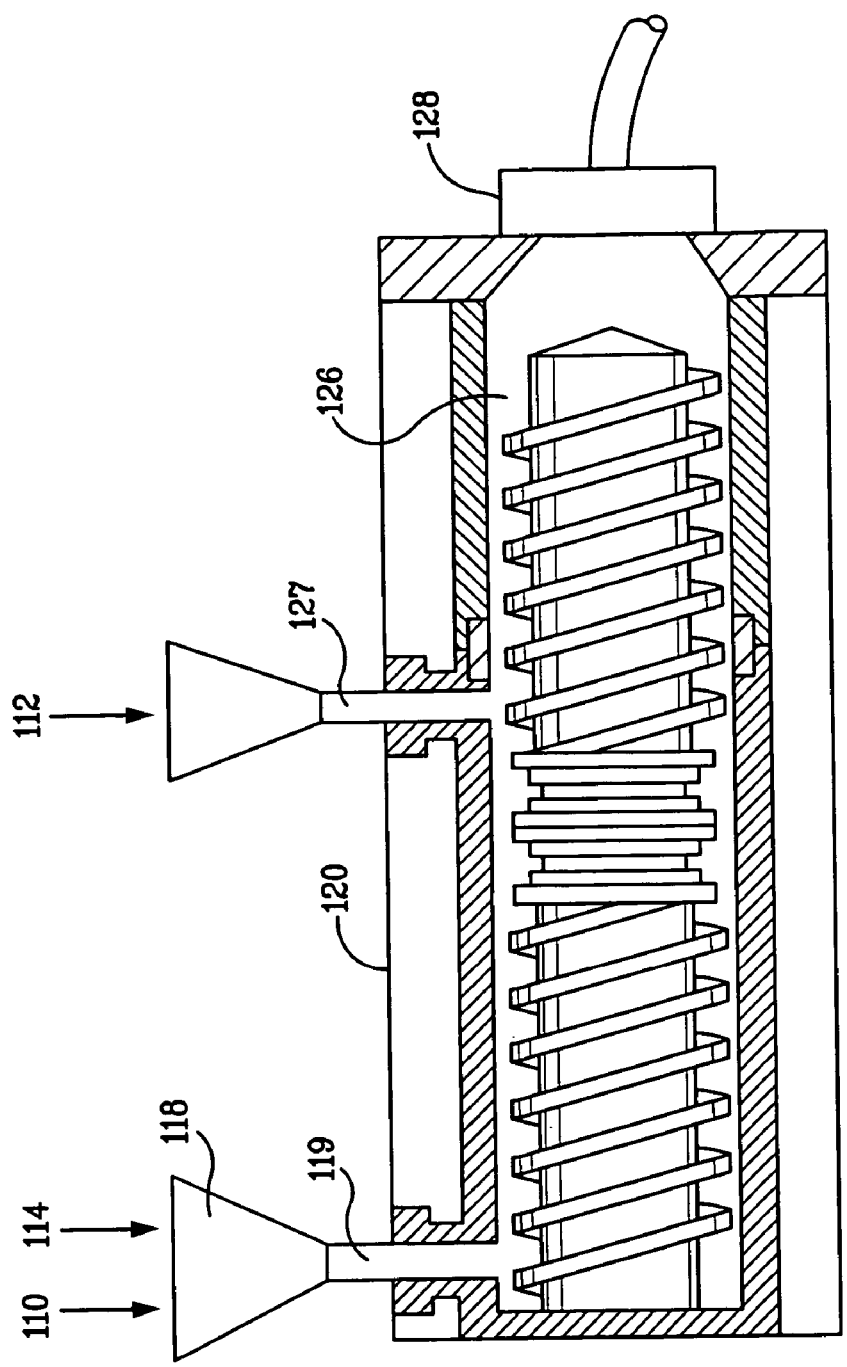
FIG. 8 depicts an exemplary schematic of a twin screw extruder with a downstream feed port for making fiber reinforced polypropylene composites of the instant invention.

Referring now to FIG. 7 an exemplary schematic of the process for making fiber reinforced polypropylene composites of the instant invention is shown. Polypropylene based resin 110, inorganic filler 112, and organic fiber 114 continuously unwound from one or more spools 116 are fed into the extruder hopper 118 of a twin screw compounding extruder 120. The extruder hopper 118 is positioned above the feed throat 119 of the twin screw compounding extruder 120. The extruder hopper 118 may alternatively be provided with an auger (not shown) for mixing the polypropylene based resin 110 and the inorganic filler 112 prior to entering the feed throat 119 of the twin screw compounding extruder 120. In an alternative embodiment, as depicted in FIG. 8, the inorganic filler 112 may be fed to the twin screw compounding extruder 120 at a downstream feed port 127 in the extruder barrel 126 positioned downstream of the extruder hopper 118 while the polypropylene based resin 110 and the organic fiber 114 are still metered into the extruder hopper 118 and enter via the feed throat 119.

Referring again to FIG. 7, the polypropylene based resin 110 is metered to the extruder hopper 118 via a feed system 130 for accurately controlling the feed rate. Similarly, the inorganic filler 112 is metered to the extruder hopper 118 via a feed system 132 for accurately controlling the feed rate. The feed systems 130, 132 may be, but are not limited to, gravimetric feed system or volumetric feed systems. Gravimetric feed systems are particularly preferred for accurately controlling the weight percentage of polypropylene based resin 110 and inorganic filler 112 being fed to the extruder hopper 118.

The feed rate of organic fiber 114 to the extruder hopper 118 is controlled by a combination of the extruder screw speed, number of fiber filaments and the thickness of each filament in a given fiber spool, and the number of fiber spools 116 being unwound simultaneously to the extruder hopper 118. The higher the extruder screw speed measured in revolutions per minute (rpms), the greater will be the rate at which organic fiber 114 is fed to the twin screw compounding screw 120. The rate at which organic fiber 114 is fed to the extruder hopper also increases with the greater the number of filaments within the organic fiber 114 being unwound from a single fiber spool 116, the greater filament thickness, the greater the number fiber spools 116 being unwound simultaneously, and the rotations per minute of the extruder.

The twin screw compounding extruder 120 includes a drive motor 122, a gear box 124, an extruder barrel 126 for holding two screws (not shown), and a strand die 128. The extruder barrel 126 is segmented into a number of heated temperature control zones 128a. As depicted in FIG. 7, the extruder barrel 126 includes a total of ten temperature control zones 128a. The two screws within the extruder barrel 126 of the twin screw compounding extruder 120 may be intermeshing or non-intermeshing, and may rotate in the same direction (co-rotating) or rotate in opposite directions (counter-rotating). From a processing perspective, the melt temperature must be maintained above that of the polypropylene based resin 110, and far below the melting temperature of the organic fiber 114, such that the mechanical properties imparted by the organic fiber will be maintained when mixed into the polypropylene based resin 110. In one exemplary embodiment, the barrel temperature of the extruder zones did not exceed 154° C. when extruding PP homopolymer and PET fiber, which yielded a melt temperature above the melting point of the PP homopolymer, but far below the melting point of the PET fiber. In another exemplary embodiment, the barrel temperatures of the extruder zones are set at 185° C. or lower.

Figure 9:
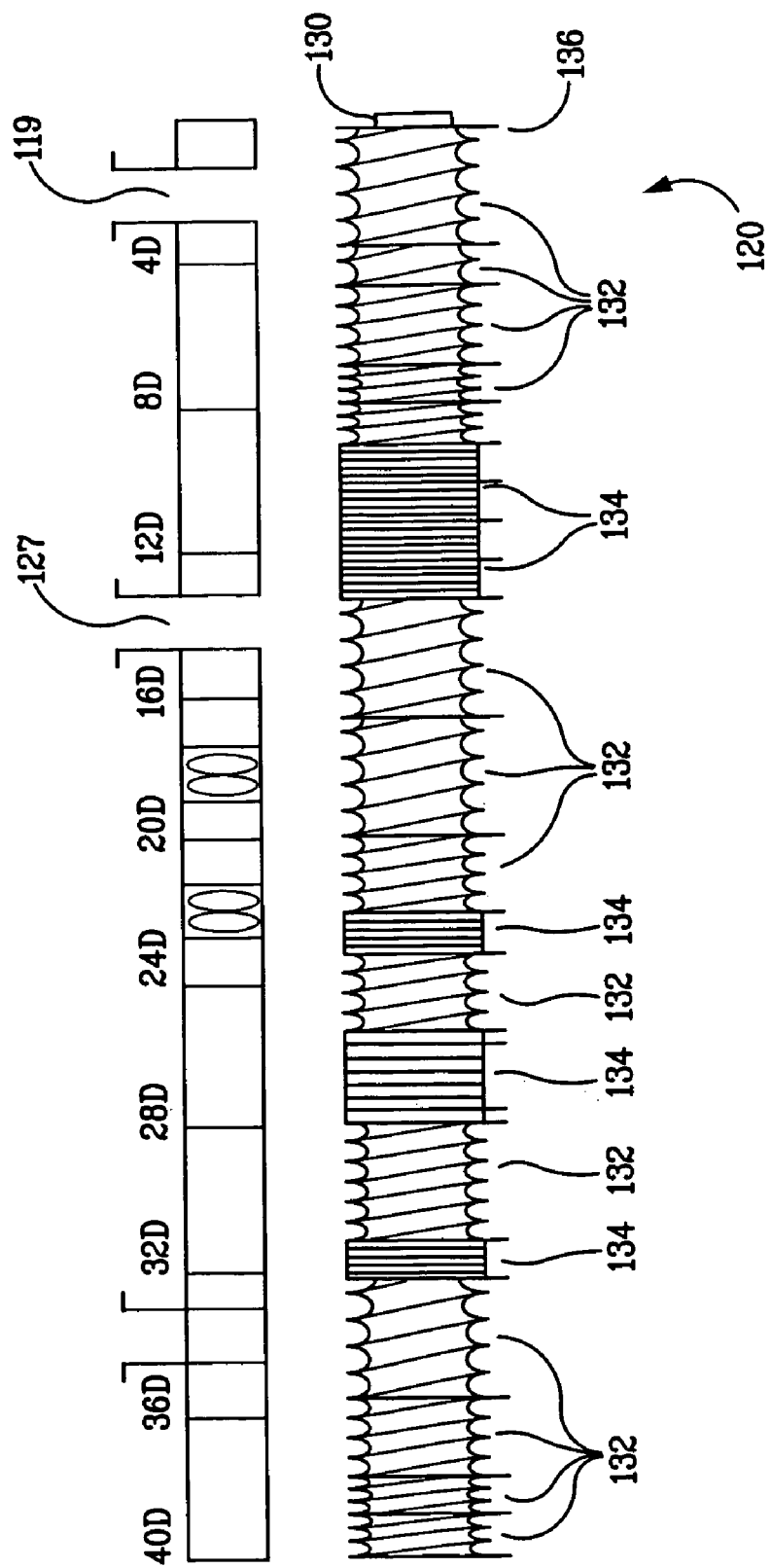
FIG. 9 depicts an exemplary schematic of a twin screw extruder screw configuration for making fiber reinforced polypropylene composites of the instant invention.

An exemplary schematic of a twin screw compounding extruder 120 screw configuration for making fiber reinforced polypropylene composites is depicted in FIG. 9. The feed throat 119 allows for the introduction of polypropylene based resin, organic fiber, and inorganic filler into a feed zone of the twin screw compounding extruder 120. The inorganic filler may be optionally fed to the extruder 120 at the downstream feed port 127. The twin screws 130 include an arrangement of interconnected screw sections, including conveying elements 132 and kneading elements 134. The kneading elements 134 function to melt the polypropylene based resin, cut the organic fiber lengthwise, and mix the polypropylene based melt, chopped organic fiber and inorganic filler to form a uniform blend. More particularly, the kneading elements function to break up the organic fiber into about ⅛ inch to about 1 inch fiber lengths. A series of interconnected kneading elements 34 is also referred to as a kneading block. U.S. Pat. No. 4,824,256 to Haring, et al., herein incorporated by reference in its entirety, discloses co-rotating twin screw extruders with kneading elements. The first section of kneading elements 134 located downstream from the feed throat is also referred to as the melting zone of the twin screw compounding extruder 120. The conveying elements 132 function to convey the solid components, melt the polypropylene based resin, and convey the melt mixture of polypropylene based polymer, inorganic filler and organic fiber downstream toward the strand die 128 (shown in FIG. 8) at a positive pressure.

The position of each of the screw sections as expressed in the number of diameters (D) from the start 136 of the extruder screws 130 is also depicted in FIG. 9. The extruder screws in FIG. 9 have a length to diameter ratio of 40/1, and at a position 32D from the start 136 of screws 130, there is positioned a kneading element 134. The particular arrangement of kneading and conveying sections is not limited to that as depicted in FIG. 9, however one or more kneading blocks consisting of an arrangement of interconnected kneading elements 134 may be positioned in the twin screws 130 at a point downstream of where organic fiber and inorganic filler are introduced to the extruder barrel. The twin screws 130 may be of equal screw length or unequal screw length. Other types of mixing sections may also be included in the twin screws 130, including, but not limited to, Maddock mixers, and pin mixers.

Referring once again to FIG. 7, the uniformly mixed fiber reinforced polypropylene composite melt comprising polypropylene based polymer 110, inorganic filler 112, and organic fiber 114 is metered by the extruder screws to a strand die 128 for forming one or more continuous strands 140 of fiber reinforced polypropylene composite melt. The one or more continuous strands 140 are then passed into water bath 142 for cooling them below the melting point of the fiber reinforced polypropylene composite melt to form a solid fiber reinforced polypropylene composite strands 144. The water bath 142 is typically cooled and controlled to a constant temperature much below the melting point of the polypropylene based polymer. The solid fiber reinforced polypropylene composite strands 144 are then passed into a pelletizer or pelletizing unit 146 to cut them into fiber reinforced polypropylene composite resin 148 measuring from about ¼ inch to about 1 inch in length. The fiber reinforced polypropylene composite resin 148 may then be accumulated in containers 150 or alternatively conveyed to silos for storage and eventual conveyance to injection molding line 200 (not shown).

The present invention is further illustrated by means of the following examples, and the advantages thereto without limiting the scope thereof.

Test Methods

Fiber reinforced polypropylene compositions described herein were injection molded at 2300 psi pressure, 401° C. at all heating zones as well as the nozzle, with a mold temperature of 60° C.

Flexural modulus data was generated for injected molded samples produced from the fiber reinforced polypropylene compositions described herein using the ISO 178 standard procedure.

Instrumented impact test data was generated for injected mold samples produced from the fiber reinforced polypropylene compositions described herein using ASTM D3763. Ductility during instrumented impact testing (test conditions of 15 mph, −29° C., and 25 lbs) is defined as no splintering of the sample.

EXAMPLES

PP3505G is a propylene homopolymer commercially available from ExxonMobil Chemical Company of Baytown, Tex. The MFR (2.16 kg, 230° C.) of PP3505G was measured according to ASTM D1238 to be 400 g/10 min.

PP7805 is an 80 MFR propylene impact copolymer commercially available from ExxonMobil Chemical Company of Baytown, Tex.

PP8114 is a 22 MFR propylene impact copolymer containing ethylene-propylene rubber and a plastomer, and is commercially available from ExxonMobil Chemical Company of Baytown, Tex.

PP8224 is a 25 MFR propylene impact copolymer containing ethylene-propylene rubber and a plastomer, and is commercially available from ExxonMobil Chemical Company of Baytown, Tex.

PO1020 is 430 MFR maleic anhydride functionalized polypropylene homopolymer containing 0.5-1.0 weight percent maleic anhydride.

Cimpact CB7 is a surface modified talc, V3837 is a high aspect ratio talc, and Jetfine 700 C is a high surface area talc, all available from Luzenac America Inc. of Englewood, Colo.

Illustrative Examples 1-8

Varying amounts of PP3505G and 0.25" long polyester fibers obtained from Invista Corporation were mixed in a Haake single screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for instrumented impact under standard automotive conditions for interior parts (25 lbs, at 15 MPH, at −29° C.). The total energy absorbed and impact results are given in Table 1.

TABLE 1

| Example # | wt % PP3505G | wt % Fiber | Total Energy (ft-lbf) | Instrumented Impact Test Results |
|---|---|---|---|---|
| 1 | 65 | 35 | 8.6 ± 1.1 | ductile* |
| 2 | 70 | 30 | 9.3 ± 0.6 | ductile* |
| 3 | 75 | 25 | 6.2 ± 1.2 | ductile* |
| 4 | 80 | 20 | 5.1 ± 1.2 | ductile* |
| 5 | 85 | 15 | 3.0 ± 0.3 | ductile* |
| 6 | 90 | 10 | 2.1 ± 0.2 | ductile* |
| 7 | 95 | 5 | 0.4 ± 0.1 | brittle** |
| 8 | 100 | 0 | <0.1 | brittle*** |

*Examples 1-6: samples did not shatter or split as a result of impact, with no pieces coming off of the specimen.
**Example 7: pieces broke off of the sample as a result of the impact
***Example 8: samples completely shattered as a result of impact.

Illustrative Examples 9-14

In Examples 9-11, 35 wt % PP7805, 20 wt % Cimpact CB7 talc, and 45 wt % 0.25" long polyester fibers obtained from Invista Corporation, were mixed in a Haake twin screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for instrumented impact. The total energy absorbed and impact results are given in Table 2.

In Examples 12-14, PP81.14 was extruded and injection molded under the same conditions as those for Examples 9-11. The total energy absorbed and impact results are given in Table 2.

TABLE 2

| Example # | Impact Conditions/Applied Energy | Total Energy (ft-lbf) | Instrumented Impact Test Results |
|---|---|---|---|
| 35 wt % PP7805 (70 MFR), 20 wt % talc, 45 wt % fiber | | | |
| 9 | −29° C., 15 MPH, 25 lbs/192 ft-lbf | 16.5 | ductile* |
| 10 | −29° C., 28 MPH, 25 lbs/653 ft-lbf | 14.2 | ductile* |
| 11 | −29° C., 21 MPH, 58 lbs/780 ft-lbf | 15.6 | ductile* |

TABLE 2-continued

| Example # | Impact Conditions/Applied Energy | Total Energy (ft-lbf) | Instrumented Impact Test Results |
|---|---|---|---|
| | 100 wt % PP8114 (22 MFR) | | |
| 12 | −29° C., 15 MPH, 25 lbs/192 ft-lbf | 32.2 | ductile* |
| 13 | −29° C., 28 MPH, 25 lbs/653 ft-lbf | 2.0 | brittle** |
| 14 | −29° C., 21 MPH, 58 lbs/780 ft-lbf | 1.7 | brittle** |

*Examples 9-12: samples did not shatter or split as a result of impact, with no pieces coming off of the specimen.
**Examples 13-14: samples shattered as a result of impact.

Illustrative Examples 15-16

A Leistritz ZSE27 HP-60D 27-mm-twin screw extruder with a length to diameter ratio of 40:1 was fitted with six pairs of kneading elements 12" from the die exit to form a kneading block. The die was ¼" in diameter. Strands of continuous 27,300 denier PET fibers were fed directly from spools into the hopper of the extruder, along with PP7805 and talc. The kneading elements in the kneading block in the extruder broke up the fiber in situ. The extruder speed was 400 revolutions per minute, and the temperatures across the extruder were held at 190° C. Injection molding was done under conditions similar to those described for Examples 1-14. The mechanical and physical properties of the sample were measured and are compared in Table 3 with the mechanical and physical properties of PP8224.

The instrumented impact test showed that in both examples there was no evidence of splitting or shattering, with no pieces coming off the specimen. In the notched charpy test, the PET fiber-reinforced PP7805 specimen was only partially broken, and the PP8224 specimen broke completely.

TABLE 3

| Test (Method) | Example 15 PET fiber-reinforced PP7805 with talc | Example 16 PP8224 |
|---|---|---|
| Flexural Modulus, Chord (ISO 178) | 525,190 psi | 159,645 psi |
| Instrumented Impact at −30° C. Energy to maximum load 100 lbs at 5 MPH (ASTM D3763) | 6.8 J | 27.5 J |
| Notched Charpy Impact at −40° C. (ISO 179/1eA) | 52.4 kJ/m² | 5.0 kJ/m² |
| Heat Deflection Temperature at 0.45 Mpa, edgewise (ISO 75) | 116.5° C. | 97.6° C. |
| Coefficient of Linear Thermal Expansion, −30° C. to 100° C., Flow/Crossflow (ASTM E831) | 2.2/12.8 (E-5/° C.) | 10.0/18.6 (E-5/° C.) |

Illustrative Examples 17-18

In Examples 17-18, 30 wt % of either PP3505G or PP8224, 15 wt % 0.25" long polyester fibers obtained from Invista Corporation, and 45 wt % V3837 talc were mixed in a Haake twin screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for flexural modulus. The flexural modulus results are given in Table 4.

TABLE 4

| Example | Polypropylene, | Flexural Modulus, Chord, psi (ISO 178) | Instrumented Impact at −30° C. Energy to maximum load 25 lbs at 15 MPH (ASTM D3763), ft-lb |
|---|---|---|---|
| 17 | PP8224 | 433840 | 2 |
| 18 | PP3505 | 622195 | 2.9 |

The rubber toughened PP8114 matrix with PET fibers and talc displayed lower impact values than the PP3505 homopolymer. This result is surprising, because the rubber toughened matrix alone is far tougher than the low molecular weight PP3505 homopolymer alone at all temperatures under any conditions of impact. In both examples above, the materials displayed no splintering.

Illustrative Examples 19-24

In Examples 19-24, 25-75 wt % PP3505G, 15 wt % 0.25" long polyester fibers obtained from Invista Corporation, and 10-60 wt % V3837 talc were mixed in a Haake twin screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for flexural modulus. The flexural modulus results are given in Table 5.

TABLE 5

| Example | Talc Composition, | Flexural Modulus, Chord, psi (ISO 178) |
|---|---|---|
| 19 | 10% | 273024 |
| 20 | 20% | 413471 |
| 21 | 30% | 583963 |
| 22 | 40% | 715005 |
| 23 | 50% | 1024394 |
| 24 | 60% | 1117249 |

It is important to note that in examples 19-24, the samples displayed no splintering in drop weight testing at an −29° C., 15 miles per hour at 25 pounds.

Illustrative Examples 25-26

Two materials, one containing 10% ¼ inch polyester fibers, 35% PP3505 polypropylene and 60% V3837 talc (example 25), the other containing 10% ¼ inch polyester fibers, 25% PP3505 polypropylene homopolymer (example 26), 10% PO1020 modified polypropylene were molded in a Haake twin screw extruder at 175° C. They were injection molded into standard ASTM A370½ inch wide sheet type tensile specimens. The specimens were tested in tension, with a ratio of minimum to maximum load of 0.1, at flexural stresses of 70 and 80% of the maximum stress.

TABLE 6

| Percentage of Maximum Stress to Yield Point | Example 25, Cycles to failure | Example 26, Cycles to failure |
|---|---|---|
| 70 | 327 | 9848 |
| 80 | 30 | 63 |

The addition of the modified polypropylene is shown to increase the fatigue life of these materials.

Illustrative Examples 27-29

A Leistritz 27 mm co-rotating twin screw extruder with a ratio of length to diameter of 40:1 was used in these experiments. The process configuration utilized was as depicted in FIG. 7. The screw configuration used is depicted in FIG. 9, and includes an arrangement of conveying and kneading elements. Talc, polypropylene and PET fiber were all fed into the extruder feed hopper located approximately two diameters from the beginning of the extruder screws (19 in the FIG. 9). The PET fiber was fed into the extruder hopper by continuously feeding from multiple spools a fiber tow of 3100 filaments with each filament having a denier of approximately 7.1. Each filament was 27 microns in diameter, with a specific gravity of 1.38.

The twin screw extruder ran at 603 rotations per minute. Using two gravimetric feeders, PP7805 polypropylene was fed into the extruder hopper at a rate of 20 pounds per hour, while CB 7 talc was fed into the extruder hopper at a rate of 15 pounds per hour. The PET fiber was fed into the extruder at 12 pounds per hour, which was dictated by the screw speed and tow thickness. The extruder temperature profile for the ten zones 144° C. for zones 1-3, 133° C. for zone 4, 154° C. for zone 5, 135° C. for zone 6, 123° C. for zones 7-9, and 134° C. for zone 10. The strand die diameter at the extruder exit was ¼ inch.

The extrudate was quenched in an 8 foot long water trough and pelletized to ½ inch length to form PET/PP composite pellets. The extrudate displayed uniform diameter and could easily be pulled through the quenching bath with no breaks in the water bath or during instrumented impact testing. The composition of the PET/PP composite pellets produced was 42.5 wt % PP, 25.5 wt % PET, and 32 wt % talc.

The PET/PP composite resin produced was injection molded and displayed the following properties:

TABLE 7

|  | Example 27 |
| --- | --- |
| Specific Gravity | 1.3 |
| Tensile Modulus, Chord @ 23° C. | 541865 psi |
| Tensile Modulus, Chord @ 85° C. | 257810 psi |
| Flexural Modulus, Chord @ 23° C. | 505035 psi |
| Flexural Modulus, Chord @ 85° C. | 228375 psi |
| HDT @ 0.45 MPA | 116.1° C. |
| HDT @ 1.80 MPA | 76.6° C. |
| Instrumented impact @ 23° C. | 11.8 J D** |
| Instrumented impact @ −30° C. | 12.9 J D** |

**Ductile failure with radial cracks

In example 28, the same materials, composition, and process set-up were utilized, except that extruder temperatures were increased to 175° C. for all extruder barrel zones. This material showed complete breaks in the instrumented impact test both at 23° C. and −30° C. Hence, at a barrel temperature profile of 175° C., the mechanical properties of the PET fiber were negatively impacted during extrusion compounding such that the PET/PP composite resin had poor instrumented impact test properties.

In example 29, the fiber was fed into a hopper placed 14 diameters down the extruder (27 in the FIG. 9). In this case, the extrudate produced was irregular in diameter and broke an average once every minute as it was pulled through the quenching water bath. When the PET fiber tow is continuously fed downstream of the extruder hopper, the dispersion of the PET in the PP matrix was negatively impacted such that a uniform extrudate could not be produced, resulting in the irregular diameter and extrudate breaking.

Illustrative Example 30

An extruder with the same size and screw design as examples 27-29 was used. All zones of the extruder were initially heated to 180° C. PP 3505 dry mixed with Jetfine 700 C and PO 1020 was then fed at 50 pounds per hour using a gravimetric feeder into the extruder hopper located approximately two diameters from the beginning of the extruder screws. Polyester fiber with a denier of 7.1 and a thickness of 3100 filaments was fed through the same hopper. The screw speed of the extruder was then set to 596 revolutions per minute, resulting in a feed rate of 12.1 pounds of fiber per hour. After a uniform extrudate was attained, all temperature zones were lowered to 120° C., and the extrudate was pelletized after steady state temperatures were reached. The final composition of the blend was 48% PP 3505, 29.1% Jetfine 700 C, 8.6% PO 1020 and 14.3% polyester fiber.

The PP composite resin produced while all temperature zones of the extruder were set to 120° C. was injection molded and displayed the following properties:

TABLE 8

|  | Example 30 |
| --- | --- |
| Flexural Modulus, Chord @ 23° C. | 467,932 psi |
| Instrumented impact @ 23° C. | 8.0 J D** |
| Instrumented impact @ −30° C. | 10.4 J D** |

**Ductile failure with radial cracks

In another embodiment, this invention relates to:

1. A fiber reinforced composite interior trim cover panel, said interior trim cover panel molded from a composition comprising at least 30 wt % polypropylene based resin, from 10 to 60 wt % organic fiber, from 0 to 40 wt % inorganic filler, and optionally lubricant (typically present at from 0 to 0.1 wt %), based on the total weight of the composition, said interior trim cover panel having an outer surface and an underside surface.

2. The fiber reinforced composite interior trim cover panel of paragraph 1, wherein said polypropylene based resin is selected from the group consisting of polypropylene homopolymers, propylene-ethylene random copolymers, propylene-α-olefin random copolymers, propylene impact copolymers, and combinations thereof.

3. The fiber reinforced composite interior trim cover panel of paragraph 1 or 2, wherein said polypropylene based resin is polypropylene homopolymer with a melt flow rate of from about 20 to about 1500 g/10 minutes.

4. The fiber reinforced composite interior trim cover panel of paragraph 1, 2 or 3, wherein said polypropylene based resin further comprises from about 0.1 wt % to less than about 10 wt % of a polypropylene based polymer modified with a grafting agent, wherein said grafting agent is selected from the group consisting of acrylic acid, methacrylic acid, maleic acid, itaconic acid, fumaric acid or esters thereof, maleic anhydride, itaconic anhydride, and combinations thereof.

5. The fiber reinforced composite interior trim cover panel of any of paragraphs 1 to 4, wherein said lubricant is selected from the group consisting of silicon oil, silicon gum, fatty amide, paraffin oil, paraffin wax, and ester oil.

6. The fiber reinforced composite interior trim cover panel of any of paragraphs 1 to 5, wherein said organic fiber is selected from the group consisting of polyalkylene terephthalates, polyalkylene naphthalates, polyamides, polyolefins, polyacrylonitrile, and combinations thereof.

7. The fiber reinforced composite interior trim cover panel of any of paragraphs 1 to 6, wherein said inorganic filler is selected from the group consisting of talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof.

8. The fiber reinforced composite vehicle body panel of any of paragraphs 1 to 7, wherein said interior trim cover panel has a flexural modulus of at least 300,000 psi and exhibits ductility during instrumented impact testing 9. The fiber reinforced composite interior trim cover panel of any of paragraphs 1 to 8, wherein the interior trim cover panel exhibits a "hinge-effect" upon impact loading.

10. The fiber reinforced composite interior trim cover panel of any of paragraphs 1 to 9, wherein the vehicle interior trim cover is a roof trim cover panel.

11. The fiber reinforced composite vehicle body panel of any of paragraphs 1 through 9, wherein the interior trim cover panel is a pillar trim cover panel.

12. The fiber reinforced composite vehicle body panel of any of paragraphs 1 through 9, wherein the interior trim cover panel is selected from the group consisting of a steering wheel cover, a dashboard panel, an interior door trim panel, a vehicle roof rail cover and an under-dashboard panel.

13. The fiber reinforced composite vehicle body panel of any of paragraphs 1 to 12, wherein at least said outer surface of said interior trim cover panel is provided with a class A surface finish.

14. A process for producing an interior trim cover panel for a vehicle, the process comprising the step of injection molding a composition to form the interior trim cover panel for a vehicle, the interior trim cover panel having at least an outer surface and an underside surface, wherein the composition comprises at least 30 wt % polypropylene, from 10 to 60 wt % organic fiber, from 0 to 40 wt % inorganic filler, and optionally from 0 to 0.1 wt % lubricant, based on the total weight of the composition.

15. The process of paragraph 14, wherein the interior trim cover panel has a flexural modulus of at least 300,000 psi and exhibits ductility during instrumented impact testing 16. The process of paragraphs 14 or 15, wherein the interior trim cover panel is a roof trim cover panel.

17. The process of paragraphs 14 or 15, wherein the interior trim cover panel is a pillar trim cover panel.

18. The process of paragraphs 14 or 15, wherein the interior trim cover panel is selected from the group consisting of a steering wheel cover, a dashboard panel, an interior door trim panel, a vehicle roof rail cover and an under-dashboard panel.

19. The process of any of paragraphs 14 through 18, wherein the interior trim cover panel exhibits a "hinge-effect" upon impact loading.

20. The process of any of paragraphs 14 through 19, further comprising the following steps:
 (a) feeding into a twin screw extruder hopper at least about 25 wt % of a polypropylene based resin with a melt flow rate of from about 20 to about 1500 g/10 minutes;
 (b) continuously feeding by unwinding from one or more spools into the twin screw extruder hopper from about 5 wt % to about 40 wt % of an organic fiber;
 (c) feeding into a twin screw extruder from about 10 wt % to about 60 wt % of an inorganic filler;
 (d) extruding the polypropylene based resin, the organic fiber, and the inorganic filler through the twin screw extruder to form a fiber reinforced polypropylene composite melt; and
 (e) cooling the fiber reinforced polypropylene composite melt to form a solid fiber reinforced polypropylene composite;
 wherein steps (a)-(e) are conducted prior to said injection molding step.

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

When numerical lower limits and numerical upper limits are listed herein, ranges from any lower limit to any upper limit are contemplated.

We claim:

1. A fiber reinforced composite interior trim cover panel, said interior trim cover panel which comprises a composition comprising at least 30 wt % polypropylene based resin having a melt flow rate of from about 20 to about 1500 g/10 min, from 20 to 60 wt % organic fiber which comprises a polyester fiber, and 15 to 25 wt % of talc, said weight percents based on the total weight of the composition, said talc having a specific surface area of at least 14 m$^2$/gram of said talc, said interior trim cover panel having an outer surface and an underside surface, wherein said composition comprises no lubricant, has a flexural modulus of at least 300,000 psi, exhibits no splintering during instrumented impact testing (15 mph, −29° C., and 25 lbs), and has a heat distortion temperature ranging from 130° C. to 140° C.

2. The fiber reinforced composite interior trim cover panel of claim 1, wherein said polypropylene based resin is selected from the group consisting of polypropylene homopolymers, propylene-ethylene random copolymers, propylene-α-olefin random copolymers, propylene impact copolymers, and combinations thereof.

3. The fiber reinforced composite interior trim cover panel of claim 2, wherein said polypropylene based resin is polypropylene homopolymer with a melt flow rate of from about 100 to about 1500 g/10 minutes.

4. The fiber reinforced composite interior trim cover panel of claim 1, wherein the interior trim cover panel exhibits a "hinge-effect" upon impact loading.

5. The fiber reinforced composite interior trim cover panel of claim 1, wherein the vehicle interior trim cover is a roof trim cover panel.

6. The fiber reinforced composite vehicle body panel of claim 1, wherein the interior trim cover panel is a front pillar trim cover panel.

7. The fiber reinforced composite vehicle body panel of claim 1, wherein the interior trim cover panel is a center pillar trim cover panel.

8. The composite vehicle body panel of claim 1, wherein the interior trim cover panel is a quarter pillar trim cover panel.

9. The fiber reinforced composite vehicle body panel of claim 1, wherein the interior trim cover panel is selected from the group consisting of a steering wheel cover, a dashboard panel, an interior door trim panel, a vehicle roof rail cover and an under-dashboard panel.

10. The fiber reinforced composite vehicle body panel of claim 1, wherein at least said outer surface of said interior trim cover panel is provided with a class A surface finish.

11. A fiber reinforced composite interior trim cover panel, said interior trim cover panel which comprises a composition comprising at least 30 wt % polypropylene based resin having a melt flow rate of from about 80 to about 1500 g/10 min, from 10 to 15 wt % of polyester fiber, and 50 to 60 wt % of talc, said weight percents based on the total weight of the composition, said talc having a specific surface area of at least 14 $m^2$/gram of said talc, said interior trim cover panel having an outer surface and an underside surface, wherein said composition comprises no lubricant, has a flexural modulus of 850,000 to 1,200,000 psi, does not shatter during instrumented impact testing (15 mph, −29° C., and 25 lbs), and has a heat distortion temperature ranging from 130° C. to 140° C.

12. A fiber reinforced composite interior trim cover panel, said interior trim cover panel which comprises a composition comprising at least 30 wt % polypropylene based resin having a melt flow rate of from about 80 to about 1500 g/10 min, from 10 to 15 wt % of polyester fiber, and 50 to 60 wt % of talc, said weight percents based on the total weight of the composition, said talc having a specific surface area of at least 14 $m^2$/gram of said talc, said interior trim cover panel having an outer surface and an underside surface, wherein said composition comprises no lubricant, has a flexural modulus of 850,000 to 1,200,000 psi, does not shatter during instrumented impact testing (15 mph, −29° C., and 25 lbs), and has a heat distortion temperature of greater than 100° C.

13. A process for producing an interior trim cover panel for a vehicle, the process comprising the step of injection molding a composition to form the interior trim cover panel for a vehicle, the interior trim cover panel having at least an outer surface and an underside surface, wherein the composition comprises at least 30 wt % polypropylene based resin having a melt flow rate of from about 20 to about 1500 g/10 min, from 20 to 60 wt % organic fiber which comprises a polyester fiber, and 15 to 25 wt % of talc, said weight percents based on the total weight of the composition, said talc having a specific surface area of at least 14 $m^2$/gram of said talc, wherein said composition comprises no lubricant, has a flexural modulus of at least 300,000 psi, exhibits no splintering during instrumented impact testing (15 mph, −29° C., and 25 lbs), and has a heat distortion temperature ranging from 130° C. to 140° C.

14. The process of claim 13, wherein the composition is formed by a step comprising extrusion compounding to form an extrudate.

15. The process of claim 14, wherein the organic fiber is cut prior to the extrusion compounding step.

16. The process of claim 14, wherein during the extrusion compounding step, the organic fiber is a continuous fiber and is fed directly from one or more spools into an extruder hopper.

17. The process of claim 13, wherein the interior trim cover panel is a roof trim cover panel.

18. The process of claim 13, wherein the interior trim cover panel is a front pillar trim cover panel.

19. The process of claim 13, wherein the interior trim cover panel is a center pillar trim cover panel.

20. The process of claim 13, wherein the interior trim cover panel is a quarter pillar trim cover panel.

21. The process of claim 13, wherein the interior trim cover panel is selected from the group consisting of a steering wheel cover, a dashboard panel, an interior door trim panel, a vehicle roof rail cover and an under-dashboard panel.

22. The process of claim 13, wherein the interior trim cover panel exhibits a "hinge-effect" upon impact loading.

23. The process of claim 13, further comprising the step of providing at least the outer surface of the interior trim cover panel with a class A surface finish.

24. A process for making a fiber reinforced polypropylene composite interior trim cover panel, comprising the following steps:
(a) feeding into a twin screw extruder hopper at least about 25 wt % of a polypropylene based resin with a melt flow rate of from about 20 to about 1500 g/10 minutes;
(b) continuously feeding by unwinding from one or more spools into the twin screw extruder hopper from about 20 wt % to 60 wt % of an organic fiber which comprises a polyester fiber;
(c) feeding into a twin screw extruder from about 15 to 25 wt % of talc inorganic filler, said talc having a specific surface area of at least 14 $m^2$/gram of said talc;
(d) extruding the polypropylene based resin, the organic fiber, and the talc inorganic filler through the twin screw extruder to form a fiber reinforced polypropylene composite melt;
(e) cooling the fiber reinforced polypropylene composite melt to form a solid fiber reinforced polypropylene composite;
(f) injection molding the fiber reinforced polypropylene composite to form the interior trim cover panel for a vehicle, the interior trim cover panel having an outer surface and an underside surface, wherein said composite comprises no lubricant, has a flexural modulus of at least 300,000 psi, exhibits no splintering during instrumented impact testing (15 mph, −29° C., and 25 lbs), and has a heat distortion temperature ranging from 130° C. to 140° C.

25. The process of claim 24, wherein the polypropylene based resin is selected from the group consisting of polypropylene homopolymers, propylene-ethylene random copolymers, propylene-α-olefin random copolymers, propylene impact copolymers, and combinations thereof.

26. The process of claim 24, wherein said step of feeding the inorganic filler into the twin screw extruder further comprises feeding the inorganic filler into the twin screw extruder hopper via a gravimetric feed system or feeding the inorganic filler into the twin screw extruder at a downstream injection port via a gravimetric feed system.

27. The process of claim 24, wherein said step of cooling the fiber reinforced polypropylene composite melt to form a solid fiber reinforced polypropylene composite is by continuously passing strands of the fiber reinforced polypropylene composite melt through a cooled water bath.

28. The process of claim 24, further comprising the step of:
(g) providing at least the outer surface of the interior trim cover panel with a class A surface finish.

* * * * *